United States Patent
Suzuki

(10) Patent No.: US 11,655,791 B2
(45) Date of Patent: May 23, 2023

(54) INTERNAL COMBUSTION ENGINE CONTROL DEVICE

(71) Applicant: Hitachi Astemo, Ltd., Hitachinaka (JP)

(72) Inventor: Kunihiko Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/596,248

(22) PCT Filed: Aug. 14, 2020

(86) PCT No.: PCT/JP2020/030851
§ 371 (c)(1),
(2) Date: Dec. 6, 2021

(87) PCT Pub. No.: WO2021/059791
PCT Pub. Date: Apr. 1, 2021

(65) Prior Publication Data
US 2022/0316435 A1   Oct. 6, 2022

(30) Foreign Application Priority Data
Sep. 26, 2019   (JP) .............................. JP2019-175692

(51) Int. Cl.
*F02P 5/15* (2006.01)
*F02P 5/152* (2006.01)
*F02P 5/04* (2006.01)

(52) U.S. Cl.
CPC ............... *F02P 5/152* (2013.01); *F02P 5/045* (2013.01)

(58) Field of Classification Search
CPC .......... F02P 5/152; F02P 5/045; F02P 5/1502; F02P 17/12; F02D 37/02; F02D 41/0007;
(Continued)

(56) References Cited

U.S. PATENT DOCUMENTS

| 5,361,213 A | 11/1994 | Fujieda et al. |
| 6,092,018 A | 7/2000 | Puskorius et al. |
| 2010/0082126 A1 | 4/2010 | Matsushita |

FOREIGN PATENT DOCUMENTS

| JP | 3-235723 A | 10/1991 |
| JP | 8-63203 A | 3/1996 |

(Continued)

OTHER PUBLICATIONS

International Search Report (PCT/ISA/210) issued in PCT Application No. PCT/JP2020/030851 dated Nov. 10, 2020 with English translation (seven (7) pages).
(Continued)

*Primary Examiner* — Hai H Huynh
(74) *Attorney, Agent, or Firm* — Crowell & Moring LLP

(57) ABSTRACT

Provided is an internal combustion engine control device capable of reducing a control error of the ignition timing as compared with the conventional technique. The internal combustion engine control device of the present disclosure includes a neural network model that receives three or more variables including at least a rotation speed, a load, and another specific variable of an internal combustion engine as inputs and outputs a control amount of the internal combustion engine. The neural network model includes a first neural network model having a reference value of the specific variable as an input and a second neural network model having a current value of the specific variable as an input. The internal combustion engine control device of the present disclosure corrects a reference value of the control amount calculated based on the rotation speed and the load using a difference or a ratio between the output of the first neural network model and the output of the second neural network model as a correction amount.

16 Claims, 21 Drawing Sheets

(58) Field of Classification Search
CPC .. F02D 41/1405; F02D 41/22; F02D 41/2477; Y02T 10/40
USPC ............ 123/406.18, 406.23, 406.24, 406.35; 701/110
See application file for complete search history.

(56) References Cited

FOREIGN PATENT DOCUMENTS

| | | |
|---|---|---|
| JP | 2005-69130 A | 3/2005 |
| JP | 2010-86397 A | 4/2010 |
| JP | 2018-72938 A | 5/2018 |
| JP | 2019-101514 A | 6/2019 |
| WO | WO 2017/149722 A1 | 9/2017 |

OTHER PUBLICATIONS

Japanese-language Written Opinion (PCT/ISA/237) issued in PCT Application No. PCT/JP2020/030851 dated Nov. 10, 2020 (three (3) pages).

FIG. 3A
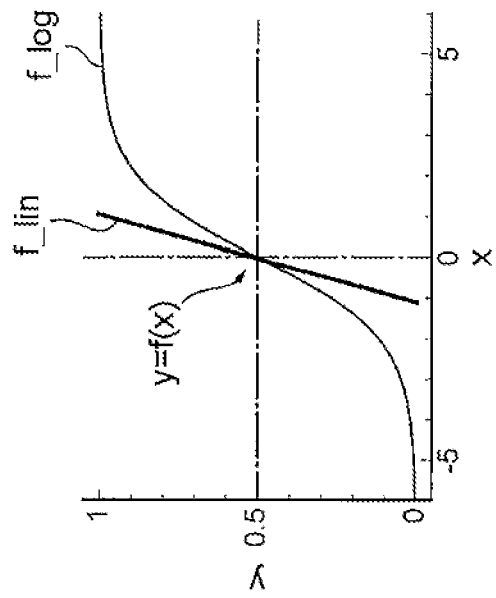
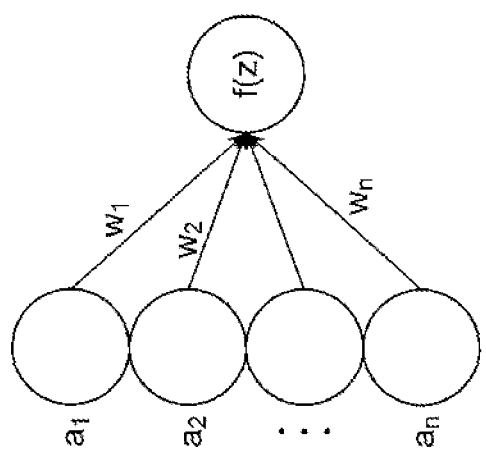

FIG. 6
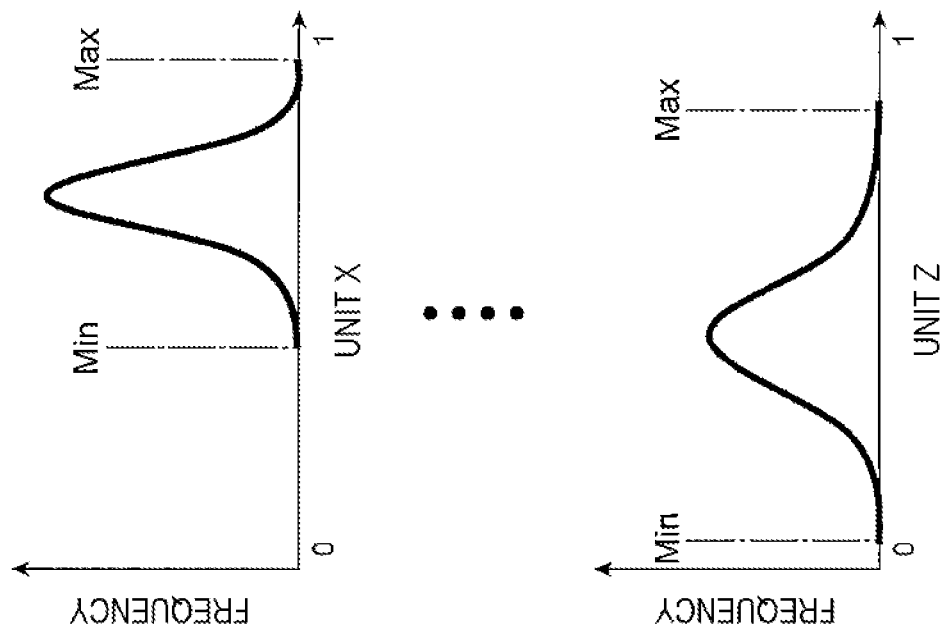
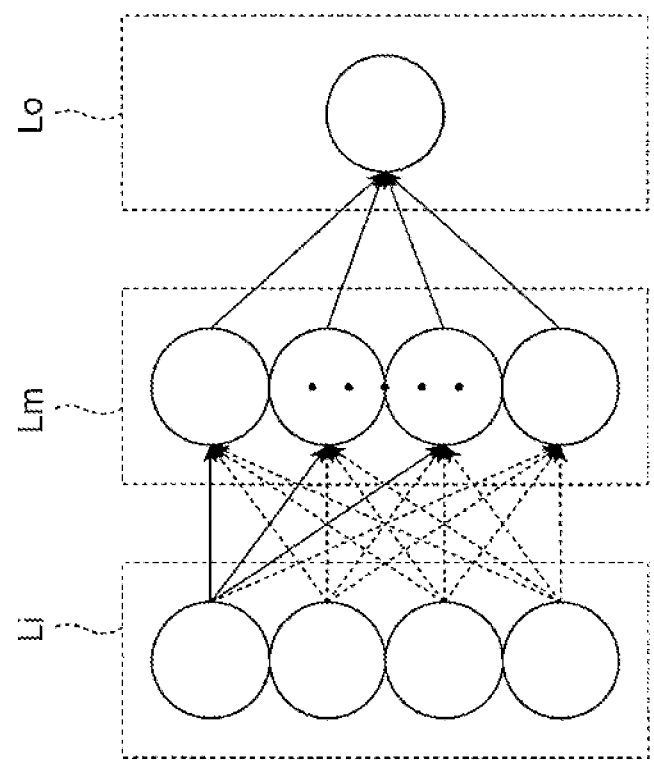

DEF

OLC

DEL

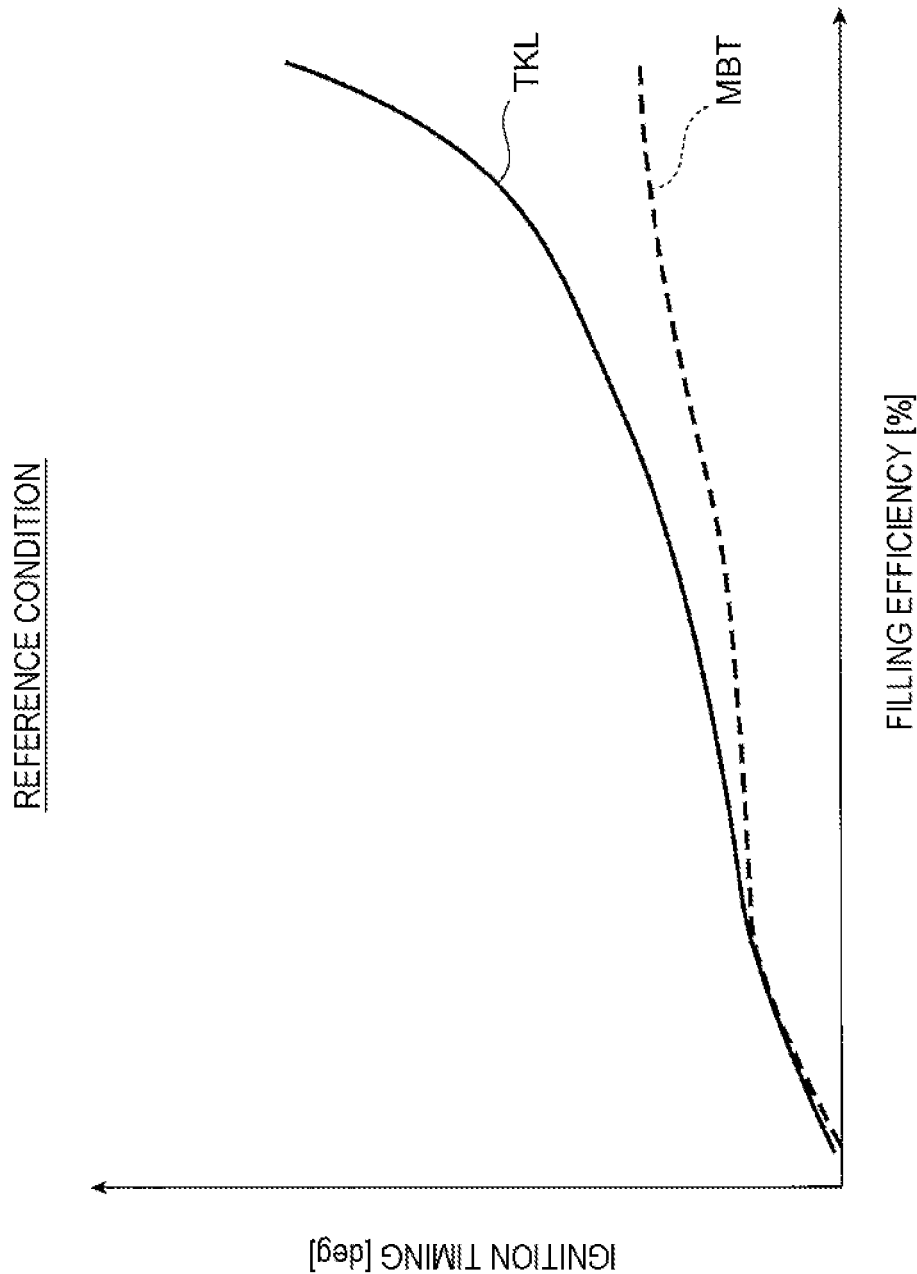

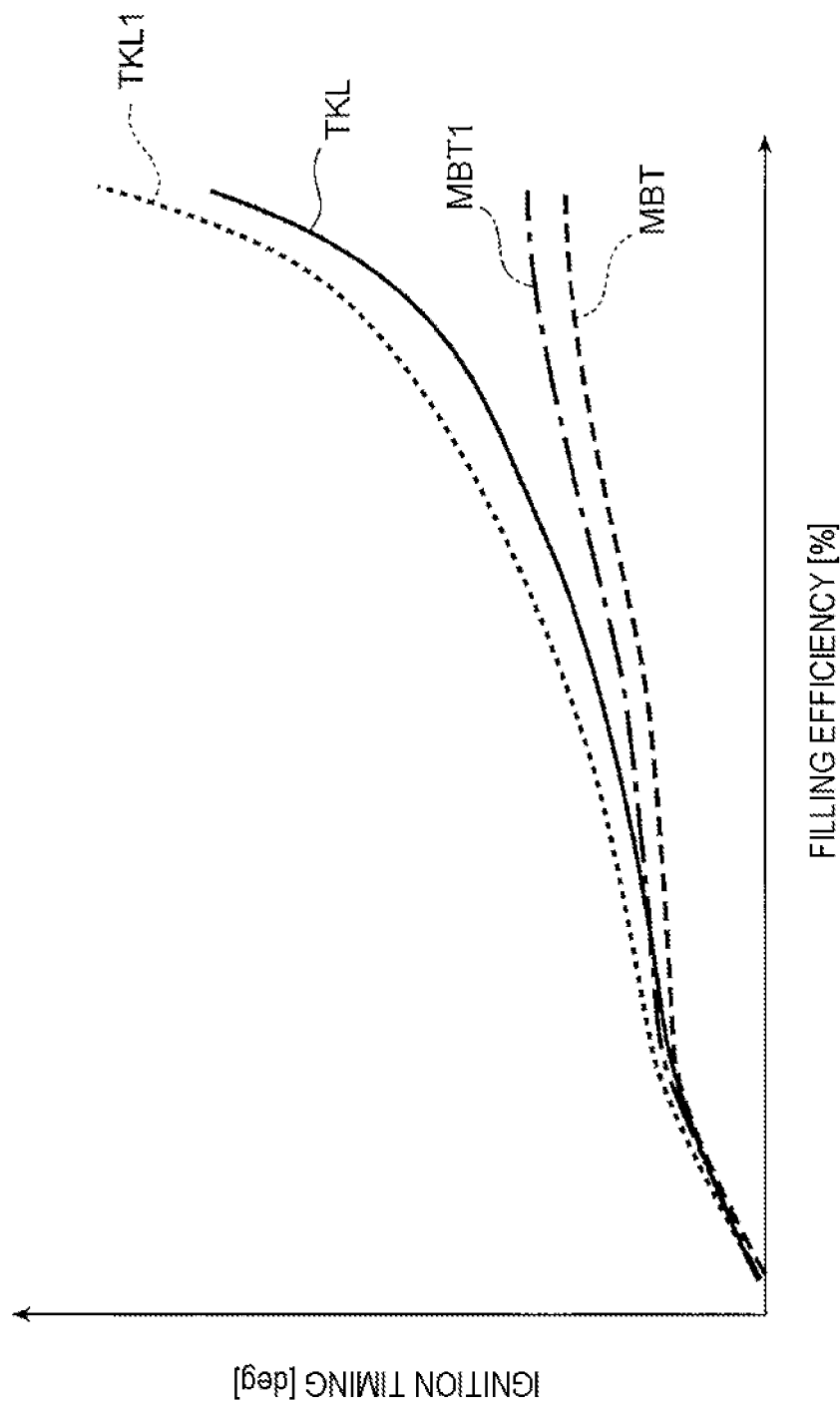

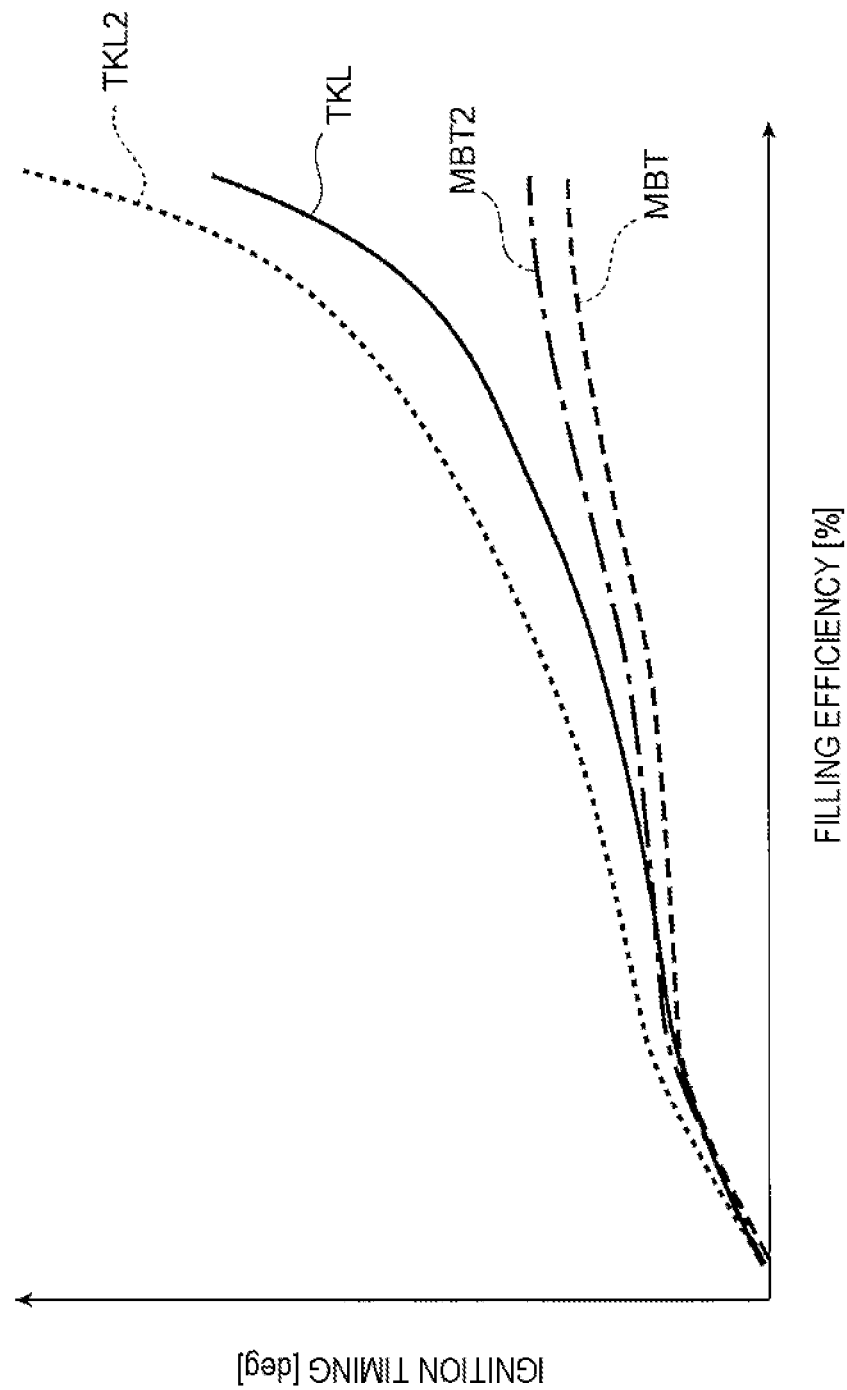

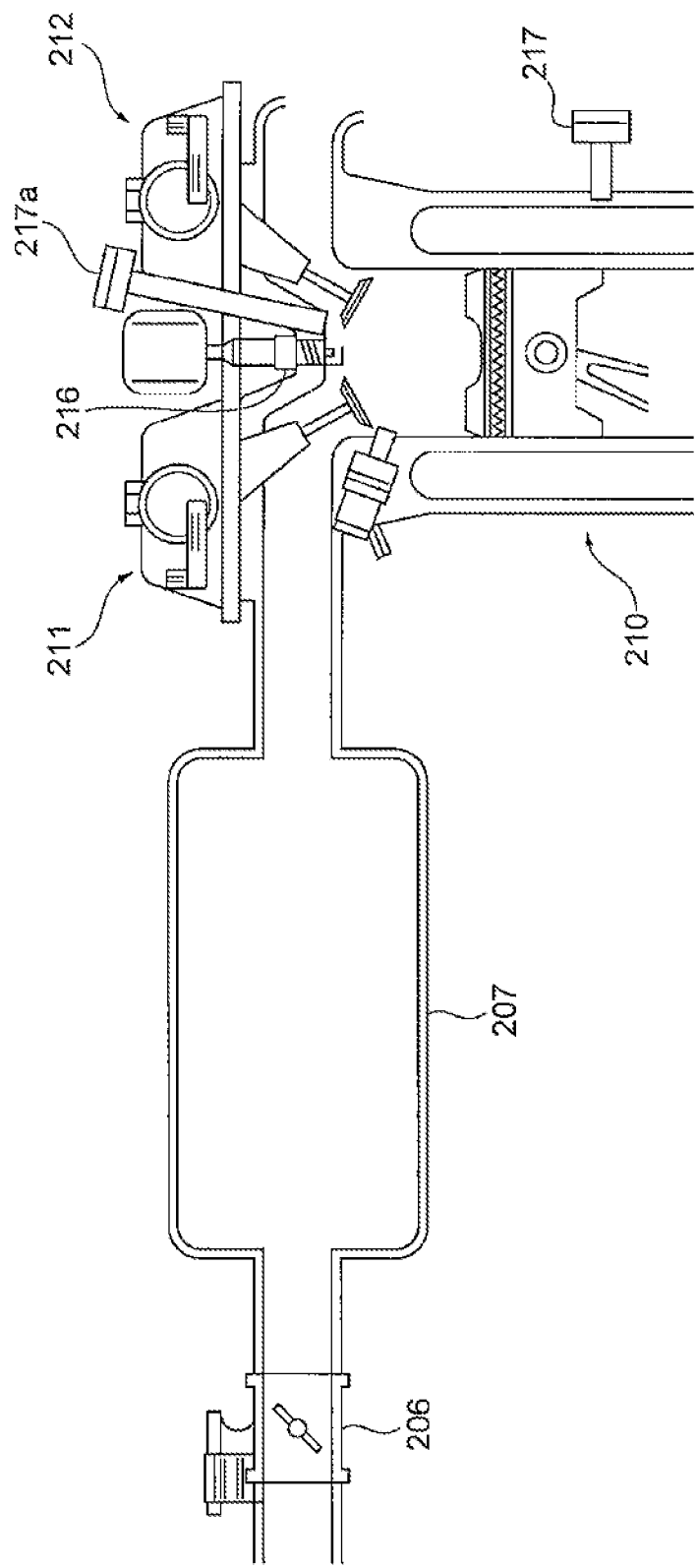

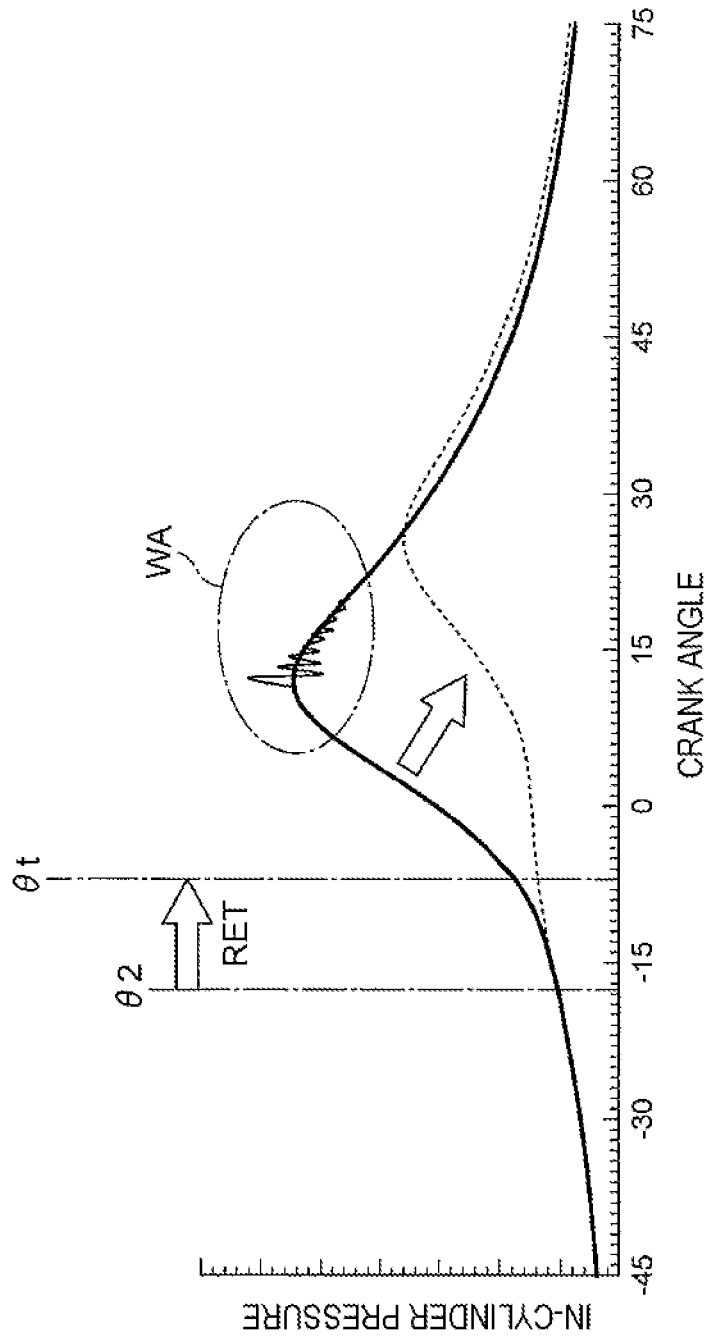

INTERNAL COMBUSTION ENGINE CONTROL DEVICE

TECHNICAL FIELD

The present disclosure relates to an internal combustion engine control device.

BACKGROUND ART

Conventionally, an invention related to ignition timing control of an internal combustion engine including a variable compression ratio mechanism that varies a compression ratio is known (see PTL 1 below). This conventional internal combustion engine control device enables easy and highly accurate control of ignition timing according to a variably controlled compression ratio (see Abstract and the like of PTL 1).

This conventional control device sets a basic compression ratio according to an engine operating state and detects an actual compression ratio. Then, the conventional control device sequentially sets a retard correction coefficient and a retard correction amount when ΔCR>0 according to the sign (positive or negative) of a compression ratio deviation ΔCR ((actual compression ratio)−(basic compression ratio)) and retards the basic ignition timing set according to an engine operating state. In addition, when ΔCR<0, the conventional control device sequentially sets an advance correction coefficient and an advance correction amount to advance the ignition timing (see Abstract and the like of PTL 1).

CITATION LIST

Patent Literature

PTL 1: JP 2005-069130 A

SUMMARY OF INVENTION

Technical Problem

The conventional internal combustion engine control device controls the ignition timing based only on the compression ratio. In such control, depending on the operating condition of the internal combustion engine, a control error of the ignition timing may occur due to the influence of parameters other than the compression ratio on the ignition timing. In a case where the control error of the ignition timing is an advance side error, knocking that is improper combustion may occur in the internal combustion engine. In a case where the control error of the ignition timing is a retard side error, deterioration of thermal efficiency or combustion fluctuation may occur in the internal combustion engine.

The present disclosure provides an internal combustion engine control device capable of reducing a control error of the ignition timing as compared with the conventional technique.

Solution to Problem

An aspect of the present disclosure is an internal combustion engine control device including: a neural network model that receives three or more variables including at least a rotation speed, a load, and another specific variable of an internal combustion engine as inputs and outputs a control amount of the internal combustion engine, wherein the neural network model includes a first neural network model having a reference value of the specific variable as an input and a second neural network model having a current value of the specific variable as an input, and a reference value of the control amount calculated based on the rotation speed and the load is corrected using a difference or a ratio between the output of the first neural network model and the output of the second neural network model as a correction amount.

Advantageous Effects of Invention

According to the present disclosure, it is possible to provide an internal combustion engine control device capable of reducing a control error of the ignition timing as compared with the conventional technique.

BRIEF DESCRIPTION OF DRAWINGS

FIG. 3A is an explanatory diagram of a neural network model illustrated in FIG. 2.

FIG. 6 is an explanatory diagram of a determination neural network model illustrated in FIG. 2.

FIG. 13A is a graph showing the relationship between filling efficiency and ignition timing under reference condition.

FIG. 13B is a graph showing the relationship between the filling efficiency and the ignition timing under a first correction condition.

FIG. 13C is a graph showing the relationship between the filling efficiency and the ignition timing under a second correction condition.

FIG. 15A is an explanatory diagram of a method of acquiring teacher data of MBT.

FIG. 16A is an explanatory diagram of a method of acquiring teacher data of a trace knock timing.

DESCRIPTION OF EMBODIMENTS

Hereinafter, an embodiment of an internal combustion engine control device according to the present disclosure will be described with reference to the drawings.

First Embodiment

Figure 1:
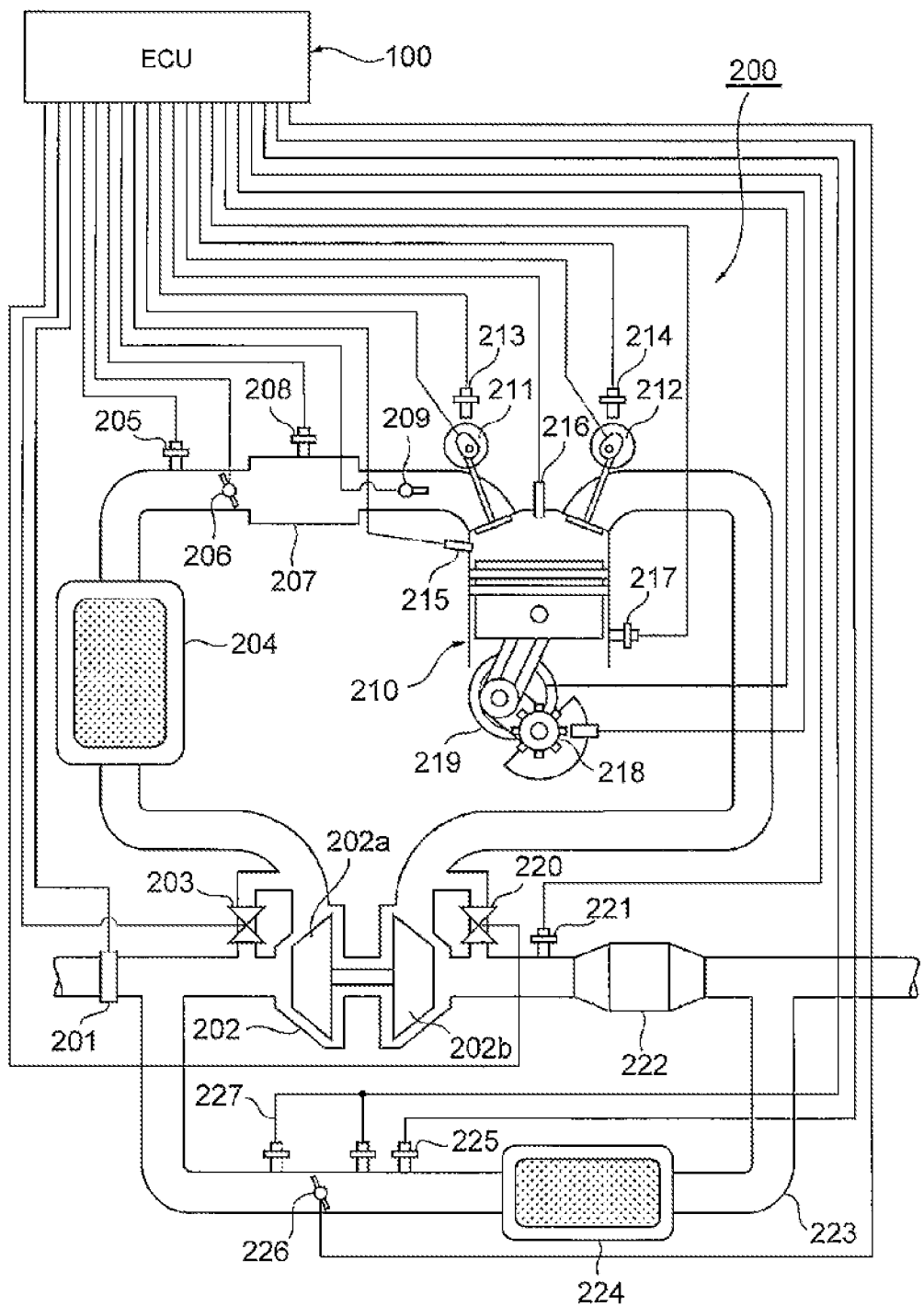
FIG. 1 is a schematic diagram illustrating a first embodiment of an internal combustion engine control device according to the present disclosure.

FIG. 1 is a schematic diagram illustrating an embodiment of an internal combustion engine control device according to the present disclosure. An internal combustion engine control device 100 of the present embodiment is configured by, for example, an electronic control unit (ECU) that controls an engine 210 of a vehicle such as an automobile, or constitutes a part of the ECU. The ECU is, for example, a microcontroller, and includes a central processing unit (CPU) (not illustrated), a storage device such as a ROM and a flash memory, various computer programs and data stored in the storage device, a timer, and an input/output unit that communicates with peripheral devices.

In the example illustrated in FIG. 1, the internal combustion engine control device 100 according to the present embodiment controls the engine 210 mounted on a vehicle such as an automobile to generate power and an engine system 200 including the peripheral devices thereof. The engine system 200 includes, for example, the engine 210 that is an internal combustion engine, and an intake flow path and an exhaust flow path connected to the engine 210. The intake flow path of the engine 210 is provided with an air flow sensor 201, a turbocharger 202, an air bypass valve 203, an intercooler 204, a supercharging temperature sensor 205, a throttle valve 206, an intake manifold 207, a supercharging pressure sensor 208, and a flow enhancing valve 209.

In addition, the engine 210 includes, for example, an intake valve 211, an exhaust valve 212, opening/closing position sensors 213 and 214, a fuel injection valve 215, an ignition plug 216, a knock sensor 217, a crank angle sensor 218, and a variable compression ratio mechanism 219. The exhaust flow path of the engine 210 is provided, for example, with a wastegate valve 220, an air-fuel ratio sensor 221, an exhaust purification catalyst 222, an exhaust gas recirculation (EGR) pipe 223, an EGR cooler 224, an EGR temperature sensor 225, an EGR valve 226, and a differential pressure sensor 227.

The air flow sensor 201 includes, for example, a temperature sensor, a flow rate sensor, and a humidity sensor, measures the temperature, the flow rate, and the humidity of the air taken into the intake flow path, and outputs the measurement result to the internal combustion engine control device 100. The turbocharger 202 includes a compressor 202a and a turbine 202b, rotates the turbine 202b by the gas flowing through the exhaust flow path, rotates the compressor 202a by the rotation of the turbine 202b, and pressure-feeds the air taken into the intake flow path to the engine 210.

The air bypass valve 203 is provided, for example, in a bypass flow path bypassing the turbocharger 202 in the intake flow path, and is opened and closed by a control signal from the internal combustion engine control device 100 to prevent the pressure of the air between the compressor 202a and the throttle valve 206 from excessively increasing. For example, when the intake manifold 207 is rapidly closed in the supercharged state, the air bypass valve 203 is opened according to the control of the internal combustion engine control device 100. In this way, the compressed air downstream of the compressor 202a flows back to the upstream of the compressor 202a through the bypass flow path, and the supercharging pressure decreases.

The intercooler 204 cools the intake air whose temperature has been increased by adiabatic compression by the compressor 202a to lower the temperature. The supercharging temperature sensor 205 measures the temperature (supercharging temperature) of the intake air cooled by the intercooler 204, and outputs the measurement result to the internal combustion engine control device 100. The throttle valve 206 is provided, for example, downstream of the supercharging temperature sensor 205 to control the amount of intake air flowing into the cylinder of the engine 210 by controlling the opening degree by the internal combustion engine control device 100. The throttle valve 206 includes, for example, a butterfly valve capable of controlling a valve opening degree by a control signal from the internal combustion engine control device 100 independently of a depression amount of an accelerator pedal by a driver of the vehicle.

The intake manifold 207 is provided downstream of the throttle valve 206, and a supercharging pressure sensor 208 is assembled thereto. The supercharging pressure sensor 208 measures the pressure (that is, the supercharging pressure) of the intake air in the intake manifold 207, and outputs the measurement result to the internal combustion engine control device 100.

The intake manifold 207 and the intercooler 204 may be integrated. In this case, the volume of the intake flow path from the compressor 202a to the cylinder of the engine 210 can be reduced, and the responsiveness of acceleration/deceleration of the vehicle can be improved.

The flow enhancing valve 209 is provided downstream of the intake manifold 207 to generate a drift in the intake air and enhance turbulence generated in the flow of the air-fuel mixture in the cylinder of the engine 210. Each of the intake valve 211 and the exhaust valve 212 is controlled by the internal combustion engine control device 100, and includes a variable valve mechanism for continuously changing the phase of the valve opening/closing position. The opening/closing position sensors 213 and 214 are provided in the variable valve mechanisms of the intake valve 211 and the exhaust valve 212, respectively, to detect the phases of the opening/closing positions of the intake valve 211 and the exhaust valve 212 and output the phases to the internal combustion engine control device 100.

The fuel injection valve 215 is, for example, a direct injection type valve that is provided in the cylinder of the engine 210 to directly inject fuel into the cylinder. The fuel injection valve 215 may be a port injection type valve that injects fuel into the intake port. The ignition plug 216 is provided in the cylinder of the engine 210 to ignite the combustible air-fuel mixture in the cylinder by a spark of an electrode portion exposed in a head of the cylinder. The knock sensor 217 is provided in a cylinder block of the engine 210 to detect the presence or absence of knock generated in the combustion chamber.

The crank angle sensor 218 is assembled to a crankshaft of the engine 210 to output a signal corresponding to a rotation angle of the crankshaft as a signal indicating a rotation speed of the crankshaft to the internal combustion engine control device 100 in each combustion cycle. The variable compression ratio mechanism 219 is provided in the crank mechanism of the engine 210, and can improve the maximum output while maintaining the thermal efficiency in the optimum state by changing the compression ratio under the control of the internal combustion engine control device 100 according to the operating state of the engine 210.

The wastegate valve 220 is, for example, an electric valve which is provided in a bypass flow path bypassing the turbocharger 202 in the exhaust flow path and whose opening degree is controlled by a control signal from the internal combustion engine control device 100. For example, the internal combustion engine control device 100 adjusts the opening degree of the wastegate valve 220 based on the supercharging pressure measured by the supercharging pressure sensor 208, whereby it is possible to suppress a portion of the exhaust gas from passing through the bypass flow path of the exhaust flow path to be delivered to the turbine 202*b* of the turbocharger 202. As a result, the supercharging pressure can be held at the target pressure.

The air-fuel ratio sensor 221 is provided, for example, downstream of the wastegate valve 220 of the exhaust flow path to measure the oxygen concentration of the exhaust gas, that is, the air-fuel ratio, and output the measurement result to the internal combustion engine control device 100. The exhaust purification catalyst 222 is provided, for example, downstream of the air-fuel ratio sensor 221 in the exhaust flow path to purify harmful exhaust gas components such as carbon monoxide, nitrogen compounds, and unburned hydrocarbon in the exhaust gas by a catalytic reaction.

The EGR pipe 223 connects a portion of the exhaust flow path on the downstream side of the exhaust purification catalyst 222 and a portion of the intake flow path on the upstream side of the compressor 202*a* of the turbocharger 202, and recirculates a portion of the exhaust gas having passed through the exhaust purification catalyst 222 to the intake flow path on the upstream side of the compressor 202*a*. The EGR cooler 224 is provided in the EGR pipe 223 to cool the exhaust gas passing through the EGR pipe 223. The EGR temperature sensor 225 is provided, for example, between the EGR cooler 224 and the EGR valve 226 to measure the temperature of the exhaust gas flowing through the EGR pipe 223, and output the measured temperature to the internal combustion engine control device 100.

The EGR valve 226 is provided, for example, between the EGR temperature sensor 225 and the intake flow path to control the flow rate of the exhaust gas recirculated from the exhaust flow path to the intake flow path by controlling the opening degree by the internal combustion engine control device 100. The differential pressure sensor 227 is provided in the EGR pipe 223 and installed on the upstream side and the downstream side of the EGR valve 226 to measure a differential pressure between the pressure of the exhaust gas on the upstream side of the EGR valve 226 and the pressure of the exhaust gas on the downstream side of the EGR valve 226 and output the differential pressure to the internal combustion engine control device 100.

For example, as described above, the internal combustion engine control device 100 is connected to various sensors constituting the engine system 200 and an actuator that drives each unit of the engine system 200. The internal combustion engine control device 100 controls, for example, operations of actuators such as the throttle valve 206, the intake valve 211 and the exhaust valve 212 including the variable valve mechanism, the fuel injection valve 215, and the EGR valve 226. In addition, the internal combustion engine control device 100 detects the operating state of the engine 210 based on signals input from various sensors, and ignites the ignition plug 216 at the timing determined according to the operating state.

The control error of the ignition timing of the ignition plug 216 of the engine 210 may cause problems such as knocking, deterioration of combustion efficiency, or combustion fluctuation. The internal combustion engine control device 100 according to the present embodiment has a configuration described below to reduce a control error of the ignition timing as compared with the conventional technique and prevent problems such as knocking, deterioration of combustion efficiency, or combustion fluctuation.

Figure 2:
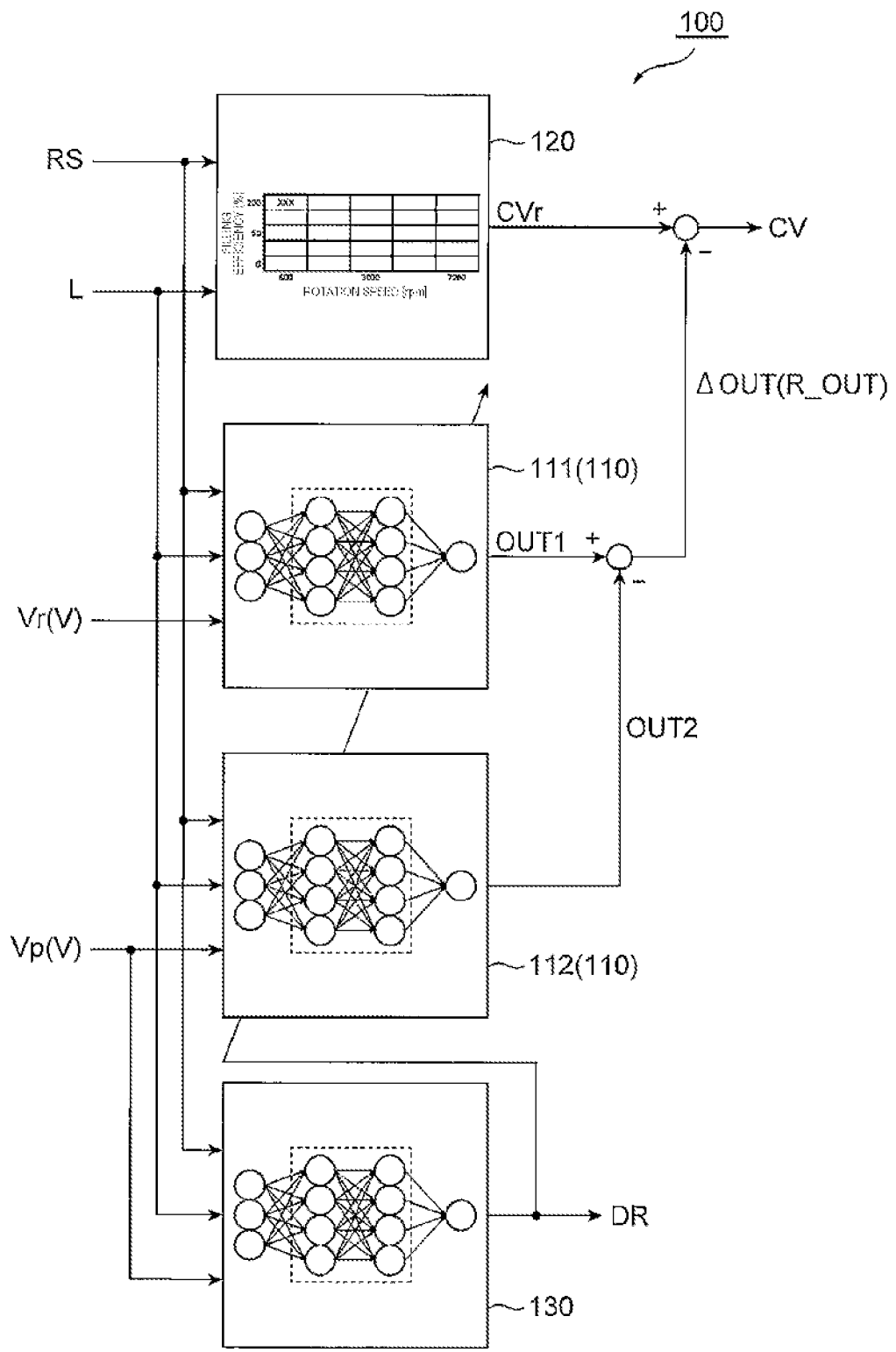
FIG. 2 is a functional block diagram of the internal combustion engine control device illustrated in FIG. 1.

FIG. 2 is a functional block diagram of the internal combustion engine control device 100 of the present embodiment. Although details will be described later, the internal combustion engine control device 100 of the present embodiment has the following configuration as a main feature.

The internal combustion engine control device 100 of the present embodiment includes, for example, a neural network model 110 that receives three or more variables including at least the rotation speed RS, the load L, and another specific variable V of the engine 210, which is an internal combustion engine, as inputs and outputs a control amount CV of the engine 210. The neural network model 110 includes a first neural network model 111 having a reference value Vr of a specific variable V as an input and a second neural network model 112 having a current value Vp of the specific variable V as an input. The internal combustion engine control device 100 corrects a reference value CVr of the control amount CV calculated based on the rotation speed RS and the load L using a difference ΔOUT or a ratio R_OUT between the output OUT1 of the first neural network model 111 and the output OUT2 of the second neural network model 112 as a correction amount.

In the present embodiment, the control amount CV of the engine 210 which is an internal combustion engine is, for example, an optimum ignition timing. The optimum ignition timing is, for example, the minimum advance for best torque (MBT) or the trace knock timing, which is the critical ignition timing at which knocking occurs.

In the present embodiment, the specific variable V of the engine 210 which is an internal combustion engine is, for example, the operation amount of the variable compression ratio mechanism 219, the operation amount of the variable valve mechanisms of the intake valve 211 and the exhaust valve 212, the cooling water temperature of the engine 210, the exhaust gas recirculation rate by the EGR pipe 223, the operation amount of the flow enhancing valve 209, the octane number of the fuel of the engine 210, the intake air temperature, the intake air humidity, the fuel injection timing, the fuel injection rate, or the air-fuel ratio.

Hereinafter, the configuration of the internal combustion engine control device 100 according to the present embodiment will be described in more detail. In the example illustrated in FIG. 2, the internal combustion engine control device 100 includes, for example, a reference map 120 and a determination neural network model 130 in addition to the above-described neural network model 110. The reference map 120 is configured to output the reference value CVr of the control amount CV of the engine 210 using the rotation speed RS and the load L of the engine 210 as inputs. The determination neural network model 130 is configured to receive the rotation speed RS of the engine 210, the load L, and the current value Vp of the specific variable V as inputs, and output a determination result DR as to whether they are within or outside an adaptation region.

Figure 3B:
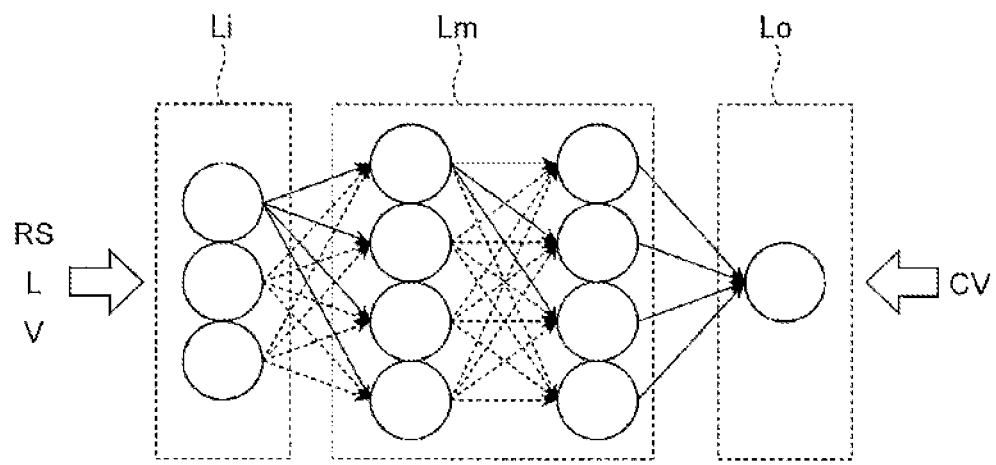
FIG. 3B is an explanatory diagram of the neural network model illustrated in FIG. 2.
Figure 3C:
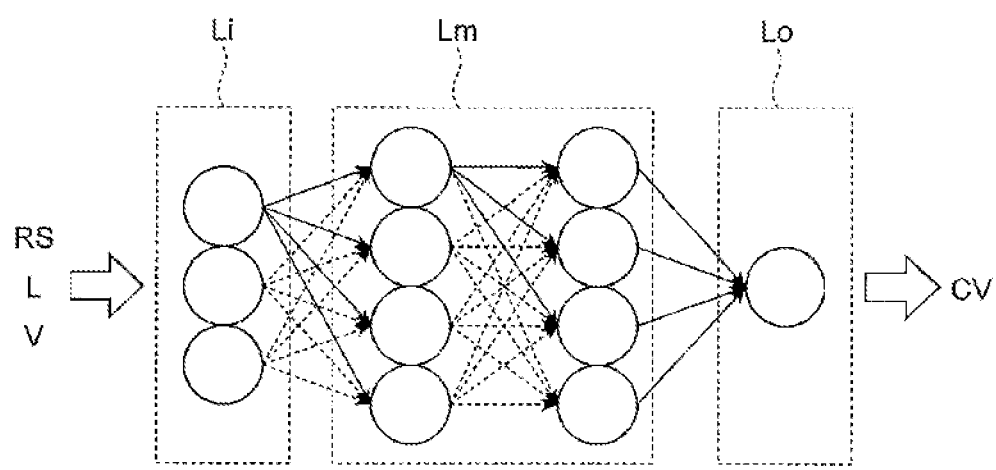
FIG. 3C is an explanatory diagram of the neural network model illustrated in FIG. 2.

FIGS. 3A to 3C are explanatory diagrams of an example of the neural network model 110. The neural network model 110 is a mathematical model imitating a mechanism of a human cranial nerve circuit, and a weight and a bias are set to each neuron (unit) constituting the model. In addition, a function called an activation function is defined for neurons. An example thereof is shown in the following Formulas (1) and (2). Note that, in Formula (1), w is a weight, and b is a bias.

$$z = w1 \cdot a1 + w2 \cdot a2 + \ldots + Wn \cdot an + b \tag{1}$$

$$a = f(z) \tag{2}$$

As illustrated in FIGS. 3B and 3C, the neural network model 110 includes layers of an input layer Li, an intermediate layer Lm, and an output layer Lo. Each of these layers includes a plurality of neurons. By increasing the number of neurons and the number of intermediate layers Lm, a more complex input/output nonlinear relationship can be approximated.

As illustrated in the graph on the right side of FIG. 3A, for example, a logistic function f_log and a linear function f_lin are appropriately selected and set as the activation function $y=f(x)$. In the neural network model 110, for example, the logistic function f_log is set as the activation function $y=f(x)$ of the intermediate layer Lm, and the linear function f_lin is set as the activation function $y=f(x)$ of the output layer Lo. There is a trade-off relationship between the approximation accuracy and the model scale, and the approximation accuracy and the model scale are set so as to satisfy both the requirements of the approximation accuracy and the model scale.

As in the supervised learning illustrated in FIG. 3B, for example, the operating state of the engine 210 such as the rotation speed RS, the load L, and a specific variable V of the engine 210 is set in the input layer Li. Further, for example, the control amount CV including the optimum ignition timing such as the MBT and the trace knock timing is set in the output layer Lo. Then, the input/output relationship of the operating state of the engine 210 can be approximated by performing machine learning on the weight w and the bias b of each neuron. An error backpropagation method can be applied to an algorithm of machine learning.

As described above, in the internal combustion engine control device 100 of the present embodiment, the neural network model 110 is a multilayer neural network model including the input layer Li, the intermediate layer Lm, and the output layer Lo. At least the rotation speed RS, the load L, and the specific variable V are set in each unit of the input layer Li, the weight w, the bias b, and the activation function $y=f(x)$ are set in each unit of the intermediate layer Lm, and the control amount CV is set in the unit of the output layer Lo.

In this way, as illustrated in FIGS. 2 and 3C, the learned neural network model 110 can perform calculation in which the rotation speed RS, the load L, and another specific variable V are used as inputs and the control amount CV such as the optimum ignition timing is set as the outputs OUT1 and OUT2.

Figure 4:
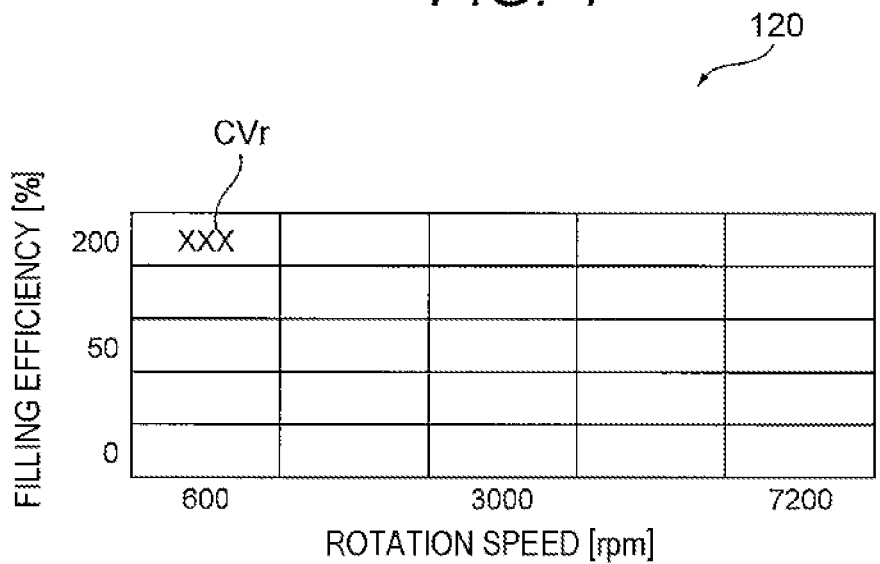
FIG. 4 is an explanatory diagram of an example of a reference map illustrated in FIG. 2.

FIG. 4 is an explanatory diagram of an example of the reference map 120 illustrated in FIG. 2. As described above, the reference map 120 is configured to output the reference value CVr of the control amount CV of the engine 210 using, for example, the rotation speed RS and the load L of the engine 210 as inputs. Here, in the internal combustion engine control device 100 of the present embodiment, for example, the filling efficiency is defined as the load L of the engine 210. The filling efficiency is a ratio of a mass of air sucked into the cylinder in one cycle to a mass of air in a standard state corresponding to a volume of the cylinder of the engine 210.

In the example illustrated in FIG. 4, the reference map 120 is a table in which the reference value CVr of the control amount CV of the engine 210 is defined according to the rotation speed RS of the engine 210 and the filling efficiency which is the load L of the engine 210. In other words, the reference map 120 is a two-dimensional map in which the horizontal axis is the rotation speed RS of the engine 210, the vertical axis is the filling efficiency which is the load L of the engine 210, and the ignition timing control amount as the reference value CVr of the control amount CV of the engine 210 is defined.

With such a configuration, the reference map 120 is configured to output the reference value CVr of the control amount CV of the engine 210 using the rotation speed RS of the engine 210 and the filling efficiency which is the load L of the engine 210 as inputs. Here, the reference value CVr is, for example, an ignition timing control amount under the reference condition. The reference condition are various device states and standard atmospheric conditions defined by the rotation speed RS and the load L of the engine 210.

Figure 5A:
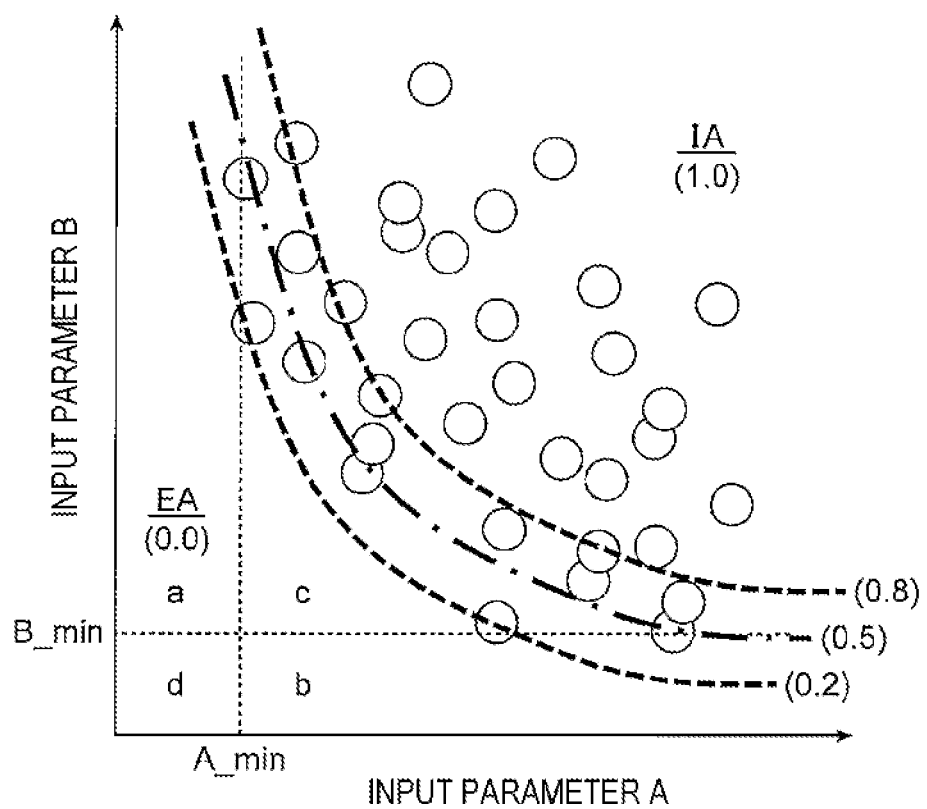
FIG. 5A is an explanatory diagram of a determination neural network model illustrated in FIG. 2.
Figure 5B:
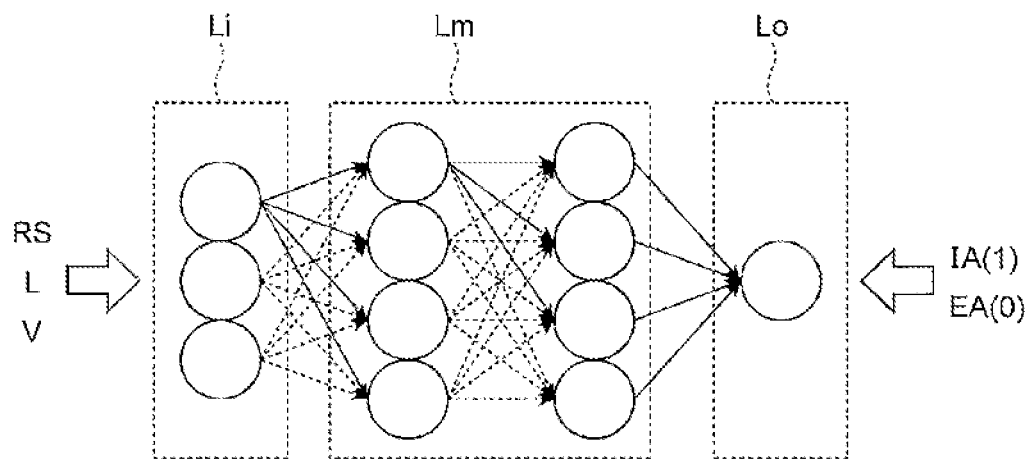
FIG. 5B is an explanatory diagram of the determination neural network model illustrated in FIG. 2.
Figure 5C:
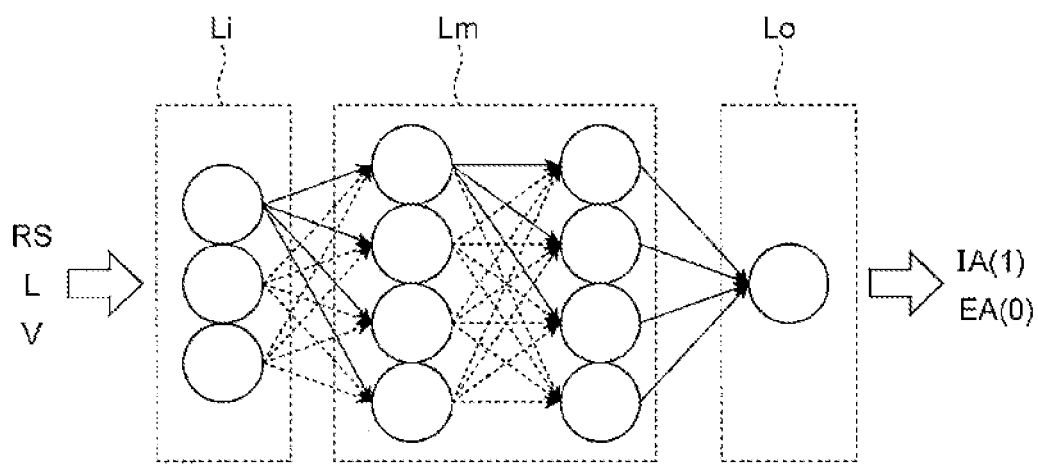
FIG. 5C is an explanatory diagram of the determination neural network model illustrated in FIG. 2.

FIGS. 5A to 5C are explanatory diagrams of an example of the determination neural network model 130 illustrated in FIG. 2. FIG. 5A is a graph illustrating an example of a method of determining an interpolation region IA, which is a learning region by the neural network model 110, and an extrapolation region EA, which is a non-learning region, with a horizontal axis as an input parameter A and a vertical axis as an input parameter B. The input parameters A and B are, for example, any two parameters of the rotation speed RS, the load L, and the specific variable V input to the determination neural network model 130 in FIG. 2.

In general, the neural network model 110 is a regression model, and the prediction capability of the interpolation region IA of the teacher data is high while the prediction capability of the extrapolation region EA is low. Therefore, in order to reduce the error, it is necessary to appropriately exclude the calculation result of the extrapolation region EA. In the example illustrated in FIG. 5A, when the position is outside the lower limit values A_min and B_min of the input parameters A and B as in the regions a, b, and d, or when the position is outside the upper limit values of the input parameters A and B, it can be determined that the position is the extrapolation region EA.

However, in the example illustrated in FIG. 5A, the interpolation region IA and the extrapolation region EA cannot be determined only by the lower limit values A_min and B_min or the upper limit values of the input parameters A and B when the position is inside the lower limit values_min and B_min or the upper limit values of the input parameters A and B but is outside the adaptation region as in the region c. Therefore, the internal combustion engine control device 100 of the present embodiment includes the determination neural network model 130 that determines the interpolation region IA that is the adaptation region and the extrapolation region EA that is a non-adaptation region.

As illustrated in FIGS. 5B and 5C, the logistic function f_log is set to the activation function y=f (x) of the intermediate layer Lm and the output layer Lo of the determination neural network model 130. The determination neural network model 130 learns by setting (0.0) indicating an unlearned state in the output layer Lo in advance for all input conditions. Furthermore, learning is performed such that the operating state of the engine 210 when learning the ignition timing such as MBT and trace knock is set in the input layer Li, and (1.0) indicating that learning has been performed is set in the output layer Lo.

By performing such learning, it is possible to construct the determination neural network model 130 of the logistic regression type that outputs a value close to (1.0) in the vicinity of the learned operating condition and outputs a value close to (0.0) in the non-learned operating condition. For example, as illustrated in FIG. 2, using the determination neural network model 130, it is possible to determine the interpolation region IA and the extrapolation region EA even when the position is inside the lower limit values A_min and B_min or the upper limit values of the input parameters A and B and outside the interpolation region IA as in the region c illustrated in FIG. 5A.

FIG. 6 is an explanatory diagram of the calculation method of the output layer Lo when the input parameters A and B of the determination neural network model 130 are located in the extrapolation region EA that is a non-learning region. The minimum value Min and the maximum value Max of each unit are defined from the frequency distribution of each unit value of the last layer of the intermediate layer Lm, that is, the layer before the output layer Lo with respect to the input parameters A and B of all learning conditions. As long as the input parameters A and B of the determination neural network model 130 exist in the interpolation region IA which is the learning region, the value of each unit in the final layer of the intermediate layer Lm is considered to exist in a range between the maximum value Max and the minimum value Min for each unit.

When it is determined that the input parameters A and B of the determination neural network model 130 are located in the extrapolation region EA that is the non-learning region, the value of each unit of the final layer of the intermediate layer Lm is diagnosed. When the unit value indicates a value equal to or larger than the maximum value Max, the maximum value Max is set, and when the unit value indicates a value equal to or smaller than the minimum value Min, the minimum value Min is set. In other words, when the determination neural network model 130, which is the logistic regression type neural network model, outputs an index indicating that it is out of the range of the learning condition, the value of the unit constituting the final layer of the intermediate layer Lm of the neural network model 110 is limited to the range of the upper and lower limit values based on the maximum value Max and the minimum value Min of each unit. By performing the upper and lower limit processing in this manner, it is possible to appropriately prevent the neural network model 110 from outputting an abnormal value even when the input parameters A and b are located in the extrapolation region EA.

As described above, the internal combustion engine control device 100 of the present embodiment includes the determination neural network model 130 which is a logistic regression type neural network model that receives at least the rotation speed RS, the load L, and the specific variable V as inputs and outputs an index indicating whether or not the rotation speed RS, the load L, and the specific variable V are within the range of the learning condition of the neural network model 110. In addition, a logistic function f_log is set as the activation function y=f (x) of the intermediate layer Lm and the output layer Lo of the determination neural network model 130.

Furthermore, the determination neural network model 130 may have a function as a diagnosis unit that diagnoses the neural network model 110 on the basis of, for example, a comparison between the value of each unit of the intermediate layer Lm and the maximum value Max and the minimum value Min of each unit of the intermediate layer Lm. In this case, the determination neural network model 130 as the diagnosis unit may output the diagnosis result at the time of executing the arithmetic operation of the neural network model 110.

Hereinafter, the operation of the internal combustion engine control device 100 according to the present embodiment will be described.

As illustrated in FIG. 1, for example, the internal combustion engine control device 100 calculates the rotation speed RS, the load L, and the specific variable V of the engine 210 using the measurement results output from various sensors constituting the engine system 200 as inputs. More specifically, the internal combustion engine control device 100 calculates, for example, the reference value Vr and the current value Vp of the specific variable V.

Here, the load L is, for example, the filling efficiency of the engine 210. The specific variable V is, for example, one or more variables selected from the group consisting of the operation amount of the variable compression ratio mechanism 219 of the engine 210, the operation amount of the variable valve mechanism, the cooling water temperature, the exhaust gas recirculation rate, the operation amount of the flow enhancing valve 209, the octane value of the fuel, the intake air temperature, the intake air humidity, the fuel injection timing, the fuel injection rate, and the air-fuel ratio.

Next, as illustrated in FIG. 2, the internal combustion engine control device 100 calculates the reference value CVr of the control amount CV by the reference map 120 using the calculated rotation speed RS and load L as inputs. More specifically, as illustrated in FIG. 4, the reference map 120 outputs the reference value CVr of the control amount CV according to the input rotation speed RS and load L.

The internal combustion engine control device 100 uses the calculated rotation speed RS, load L, and reference value Vr of the specific variable V as inputs to calculate and output an estimated value of the target value (reference value) of the ignition timing using the first neural network model 111 (output OUT1). In addition, the internal combustion engine control device 100 uses the calculated rotation speed RS, load L, and current value Vp of the specific variable V as inputs to calculate and output an estimated value of the current ignition timing using the second neural network model 112 (output OUT2).

Furthermore, the internal combustion engine control device 100 calculates a difference ΔOUT or a ratio R_OUT between the output OUT1 of the first neural network model 111 and the output OUT2 of the second neural network model 112. Then, the internal combustion engine control device 100 corrects the reference value CVr of the control amount CV, which is the ignition timing calculated by the reference map 120 based on the rotation speed RS and the load L, using the calculated difference ΔOUT or ratio R_OUT between the output OUT1 and the output OUT2 as the correction amount.

In general, in the case of using a neural network model, if an attempt is made to reduce the error of the control amount under the reference condition as much as possible with the approximation accuracy of the neural network model, there is a problem that the scale of the model becomes excessively large and the operation load increases.

On the other hand, the internal combustion engine control device 100 of the present embodiment calculates the reference value CVr of the control amount CV, which is the ignition timing, by the reference map 120 using the rotation speed RS and the load L as inputs. Then, the reference value CVr of the control amount CV is corrected by the difference ΔOUT or the ratio R_OUT between the output OUT1 and the output OUT2 of the neural network model 110 that receives the reference value Vr and the current value Vp of the specific variable V other than the rotation speed RS and the load L as inputs.

That is, in the internal combustion engine control device 100 of the present embodiment, under the reference condition, the correction amount by the neural network model 110 becomes 0, and the reference value CVr of the control amount CV, which is the output of the reference map 120, is adopted. In this way, the internal combustion engine control device 100 of the present embodiment can maximize the accuracy of the control amount CV under the reference condition, and can realize both the calculation scale of the model and the accuracy of the model having the trade-off relationship.

In the example illustrated in FIG. 2, the internal combustion engine control device 100 includes the determination neural network model 130. The determination neural network model 130 is a logistic regression type neural network model that receives at least the rotation speed RS, the load L, and the current value Vp of the specific variable V as inputs and outputs an index indicating whether or not the rotation speed RS, the load L, and the current value Vp are within the range of the learning condition of the neural network model 110. In addition, as illustrated in FIGS. 5A and 5B, for example, a logistic function f_log is set as the activation function y=f(x) of the intermediate layer Lm and the output layer Lo of the determination neural network model 130.

With such a configuration, the determination neural network model 130 uses the rotation speed RS, the load L (filling efficiency), and the current value Vp of the specific variable V as inputs to determine whether they are within the region of the adaptation region (interpolation region IA) or outside the region of the adaptation region (extrapolation region EA) as illustrated in FIG. 5A. Hereinafter, an example of the operation of the neural network model 110 and the determination neural network model 130 will be described with reference to FIG. 7.

Figure 7:
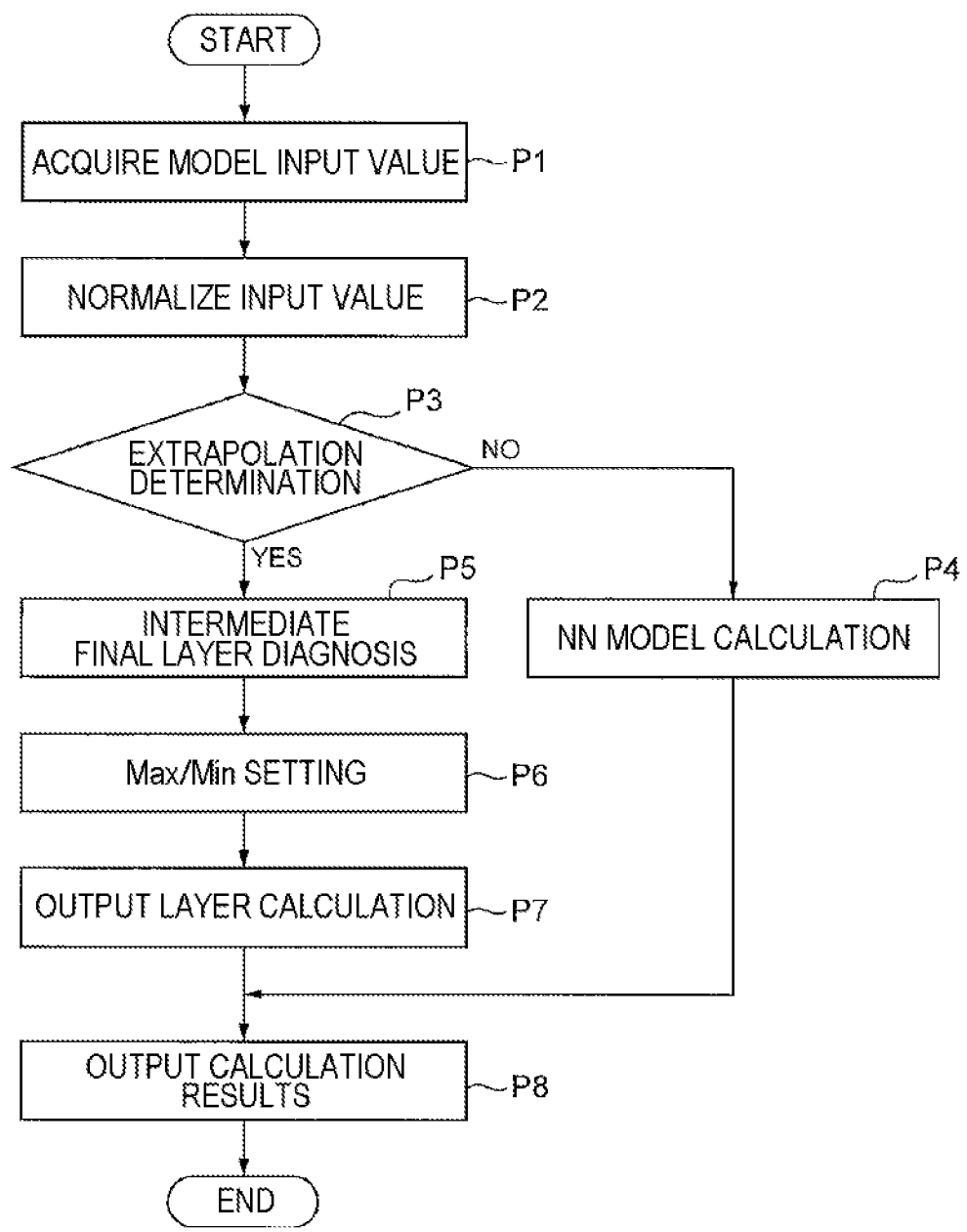
FIG. 7 is a flowchart for explaining a processing flow of the internal combustion engine control device illustrated in FIG. 1.

FIG. 7 is a flowchart illustrating a processing flow of the internal combustion engine control device 100. In process P1, the internal combustion engine control device 100 acquires, for example, the rotation speed RS, the load L, and the specific variable V (the current value Vp and the reference value Vr) as input values of the neural network model 110. Next, in process P2, the internal combustion engine control device 100 normalizes the values input to the neural network model 110 with the maximum value Max and the minimum value Min defined in advance at the time of learning as illustrated in FIG. 6. By performing this normalization, input parameters in the non-learning region (extrapolation region EA) are prevented from being input to the neural network model 110.

Next, in process P3, the internal combustion engine control device 100 performs an extrapolation determination process of determining whether the input values are in the learning region (interpolation region IA) or the non-learning region (extrapolation region EA) by the determination neural network model 130. In process P3, when the determination neural network model 130 determines that the input values are in the interpolation region IA (NO), the process proceeds to process P4.

In process P4, the internal combustion engine control device 100 performs calculation using the neural network model 110, and then executes process P8 described later. On the other hand, in process P3, when the determination neural network model 130 determines that the input values are in the extrapolation region EA (YES), the internal combustion engine control device 100 performs process P5.

In process P5, the internal combustion engine control device 100 diagnoses the value of each unit in the final layer of the intermediate layer Lm of the neural network model 110. More specifically, for example, the internal combustion engine control device 100 determines whether the value of each unit in the final layer of the intermediate layer Lm of the neural network model 110 is greater than or equal to the prescribed maximum value Max or less than or equal to the minimum value Min.

Next, in process P6, when the internal combustion engine control device 100 diagnoses that the value of each unit is equal to or larger than the maximum value Max in the previous process P5, the maximum value Max is set for each unit in the final layer of the intermediate layer Lm of the neural network model 110. In addition, in process P6, when the internal combustion engine control device 100 diagnoses that the value of each unit is equal to or less than the minimum value Min in the previous process P5, the minimum value Min is set for each unit in the final layer of the intermediate layer Lm of the neural network model 110.

Next, in process P7, the internal combustion engine control device 100 performs calculation of the output layer Lo of the neural network model 110, and then executes process P8. In process P8, an output OUT1 and an output OUT2 are output as calculation results of the neural network model 110.

As described above, the internal combustion engine control device 100 of the present embodiment includes the neural network model 110 in which three or more variables including at least the rotation speed RS of the engine 210, the load L, and another specific variable V are input and the control amount CV of the engine 210 is output. The neural network model 110 includes the first neural network model 111 having the reference value Vr of the specific variable V as an input and the second neural network model 112 having the current value Vp of the specific variable V as an input. Then, the internal combustion engine control device 100 of the present embodiment corrects the reference value CVr of the control amount CV calculated based on the rotation speed RS and the load L using the difference ΔOUT or the ratio R_OUT between the output OUT1 of the first neural network model 111 and the output OUT2 of the second neural network model 112 as the correction amount. In addition, in the internal combustion engine control device 100 of the present embodiment, the control amount CV of the engine 210 is, for example, the optimum ignition timing.

With such a configuration, the control amount CV can be accurately corrected by the neural network model 110 even when the control amount CV has a large influence of the interaction between the correction variables such as the rotation speed RS, the load L, and the specific variable V, for example, the optimum ignition timing such as the MBT or the trace knock timing. Furthermore, in the internal combustion engine control device 100 of the present embodiment, the reference value CVr of the control amount CV, which is the output of the reference map 120 based on the rotation speed RS and the load L, is adopted under the reference condition. Therefore, according to the internal combustion engine control device 100 of the present embodiment, it is possible to achieve a trade-off relationship between the calculation load and the accuracy of the control amount CV without requiring large-scale neural network model approximation. The control amount CV is not limited to the optimum ignition timing, and may be another control amount of the engine 210.

In the internal combustion engine control device 100 according to the present embodiment, the specific variable V of the engine 210 is, for example, the operation amount of the variable compression ratio mechanism 219, the operation amounts of the variable valve mechanisms of the intake valve 211 and the exhaust valve 212, the cooling water temperature, the exhaust gas recirculation rate (EGR rate), the operation amount of the flow enhancing valve 209, the octane number of the fuel, the intake air temperature, the intake air humidity, the fuel injection timing, the fuel injection rate, or the air-fuel ratio.

Hereinafter, with reference to FIGS. 8 to 12, the relationship between the rotation speed RS of the engine 210, the load L, and another specific variable V will be described using the operation amount of the variable compression ratio mechanism 219, the EGR rate, the operation amounts of the variable valve mechanisms of the intake valve 211 and the exhaust valve 212, and the cooling water temperature as examples.

Figure 8:
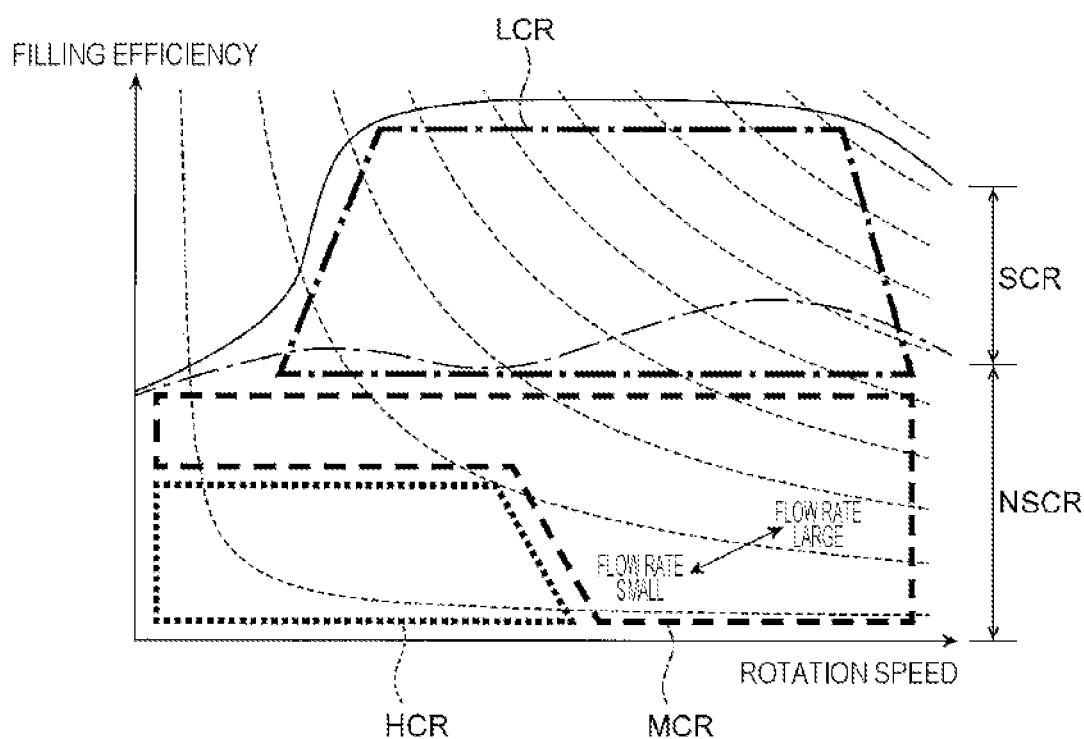
FIG. 8 is a graph for explaining an operation region in which compression ratio control by a variable compression ratio mechanism is performed.

FIG. 8 is a graph for describing an operation region in which the compression ratio control by the variable compression ratio mechanism 219 is performed. In FIG. 8, the operation region of the engine 210 is defined with the rotation speed RS as the horizontal axis and the filling efficiency as the load L as the vertical axis. The internal combustion engine control device 100 controls the operation amount of the variable compression ratio mechanism 219 in an operation region where the filling efficiency is relatively low, the load is low and the rotation speed is low and operates the engine 210 in a high compression ratio region HCR having a relatively high compression ratio.

In this way, combustion energy in the cylinder of the engine 210 can be efficiently converted into kinetic energy, and high thermal efficiency can be realized.

On the other hand, in a relatively high-load operation region where the filling efficiency of the engine 210 is high, when the compression ratio is increased, improper combustion called knocking is likely to occur. When the ignition timing is retarded in order to prevent knocking, thermal efficiency is deteriorated. That is, an excessive high compression ratio rather causes deterioration of thermal efficiency. Therefore, the internal combustion engine control device 100 controls the operation amount of the variable compression ratio mechanism 219 in the relatively high-load operation region where the filling efficiency is high, and operates the engine 210 in a low compression ratio region LCR where the compression ratio is relatively low. In this way, knocking and deterioration of thermal efficiency can be suppressed, thermal efficiency and output can be realized in a compatible manner, and the compression ratio can be appropriately controlled based on the operating state of the engine 210. Therefore, the thermal efficiency of the entire engine 210 can be improved.

As described above, the internal combustion engine control device 100 controls the operation amount of the variable compression ratio mechanism 219 based on the rotation speed RS of the engine 210 and the filling efficiency which is the load L, and controls the compression ratio of the engine 210 to the steady target state. However, since the variable compression ratio mechanism 219 incurs a response delay, even under an operating condition in which the rotation speed RS and the load L are the same, the variable compression ratio mechanism may exhibit different compression ratios depending on the immediately preceding state.

For example, under an acceleration condition for shifting the operating state from a low load condition set in a high compression ratio region HCR to a high load condition (supercharging region SCR) in a high compression ratio region HRC through a middle load condition (non-supercharging region NSCR) set in a middle compression ratio region MCR, the compression ratio is set to be on the higher compression ratio side than the steady target state due to the response delay of the variable compression ratio mechanism 219. In this case, since knocking may occur, the ignition timing of the engine 210 needs to be appropriately corrected and controlled according to the current compression ratio based on the operation amount of the variable compression ratio mechanism 219.

According to the internal combustion engine control device 100 of the present embodiment, due to the configuration illustrated in FIG. 2 described above, the ignition timing of the engine 210 can be appropriately corrected and controlled according to the current compression ratio based on the operation amount of the variable compression ratio mechanism 219 using the operation amount of the variable compression ratio mechanism 219 as the specific variable V of the engine 210.

Figure 9:
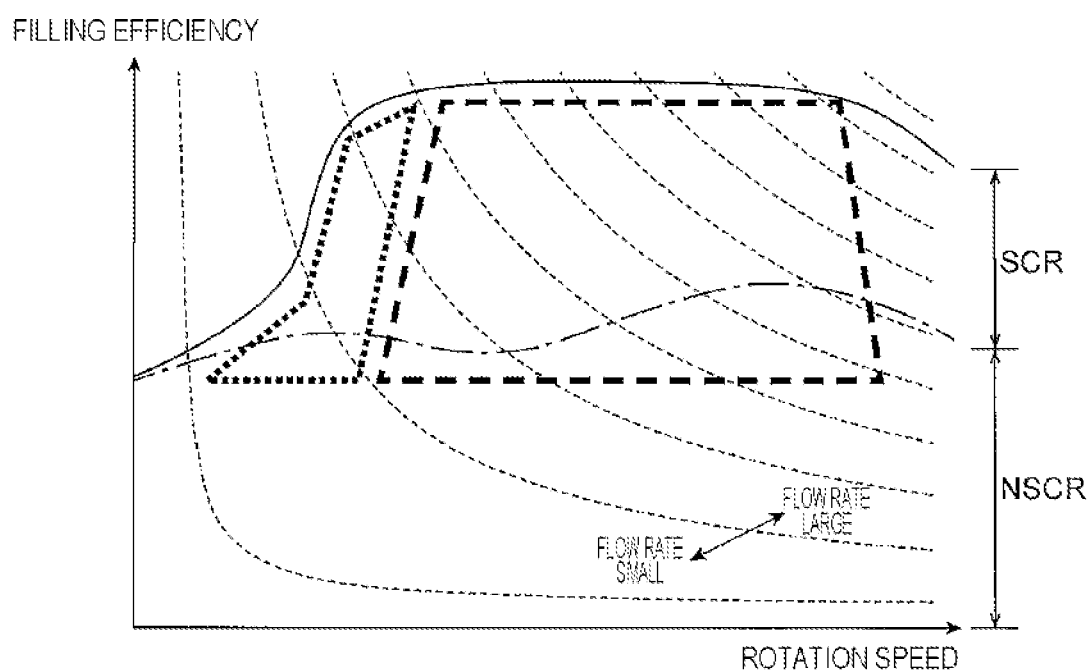
FIG. 9 is a graph for explaining an operation region where EGR is introduced.

FIG. 9 is a graph illustrating an operation region where EGR is introduced. In FIG. 9, similarly to FIG. 8, the operation region of the engine 210 is defined with the rotation speed RS as the horizontal axis and the filling efficiency as the load L as the vertical axis. The operation region of the engine 210 is roughly divided into a non-supercharging region NSCR and a supercharging region SCR. The internal combustion engine control device 100 controls the opening degree of the throttle valve 206 in the non-supercharging region NSCR, and controls the opening degree of the wastegate valve 220 by opening the throttle valve 206 in the supercharging range, thereby controlling the supercharging pressure and controlling the filling efficiency. As described above, by switching the means for adjusting the torque of the engine 210 between the non-supercharging region NSCR and the supercharging range SCR, the pump loss occurring in the engine 210 can be reduced, and the fuel-efficient operation can be realized.

Furthermore, the engine system 200 to be controlled by the internal combustion engine control device 100 of the present embodiment includes the EGR system including the EGR pipe 223, the EGR cooler 224, the EGR temperature sensor 225, the EGR valve 226, and the differential pressure sensor 227. For example, the EGR system recirculates the exhaust gas, which has passed through the exhaust purification catalyst 222 and cooled by the EGR cooler 224, to the cylinder of the engine 210 in the supercharging range SCR from a relatively high-load condition of the non-supercharging region NSCR of the engine 210. In this way, the gas sucked into the cylinder of the engine 210 is diluted with the exhaust gas which is an inert gas, and it is possible to suppress improper combustion called knocking that is likely to occur under a high load condition. By suppressing the knocking, the ignition timing can be appropriately advanced and the fuel-efficient operation can be realized.

In this manner, the EGR is controlled to the steady target EGR rate by controlling the opening degree of the EGR valve 226 based on the rotation speed and the load of the engine 210 by the internal combustion engine control device 100. On the other hand, the internal combustion engine control device 100 stops the EGR under the low temperature condition in which the condensed water is generated. As illustrated in FIG. 1, since the EGR system is provided at a position away from the cylinder of the engine 210, the EGR rate in the cylinder cannot be immediately controlled to the target value even if the EGR valve 226 is controlled.

Therefore, even under the same condition of the rotation speed RS and the load L, different EGR rates may be shown. That is, when the EGR valve 226 is opened at the time of acceleration of shifting from a low load condition in which the EGR is stopped to a high load condition in which the EGR is introduced, the EGR rate in the cylinder may become lower than the steady target state due to a response delay of the EGR caused by the flow of air in the intake pipe. In this case, the ignition timing of the engine 210 may be over-advanced to cause knocking. Therefore, it is necessary to appropriately correct and control the ignition timing of the engine 210 according to the current EGR rate in the cylinder.

According to the internal combustion engine control device 100 of the present embodiment, due to the above-described configuration illustrated in FIG. 2, it is possible to appropriately correct and control the ignition timing of the engine 210 according to the EGR rate using the EGR rate as the specific variable V of the engine 210.

Figure 10A:
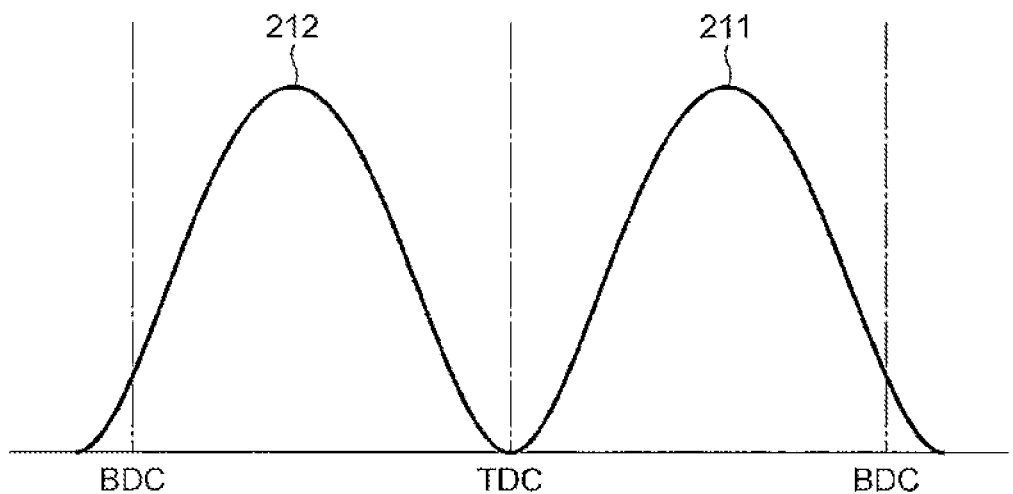
FIG. 10A is a diagram for explaining lift patterns of an intake valve and an exhaust valve.
Figure 10B:
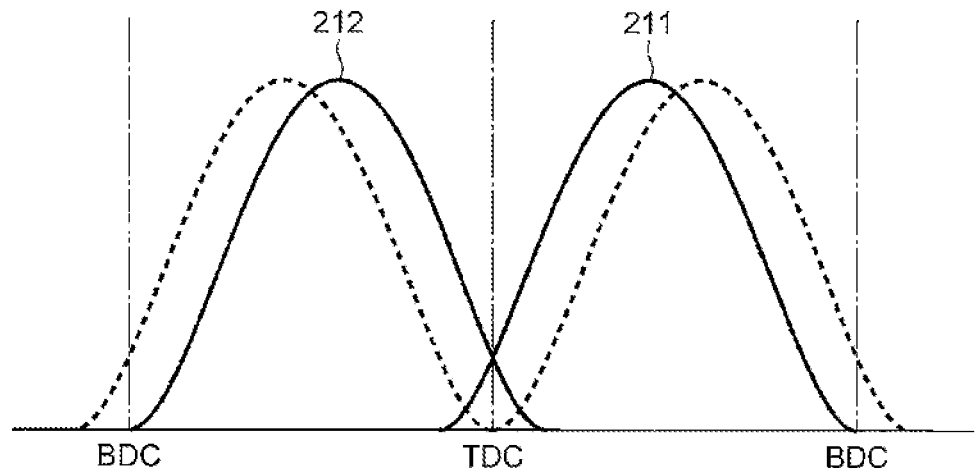
FIG. 10B is a diagram for explaining lift patterns of an intake valve and an exhaust valve.
Figure 10C:
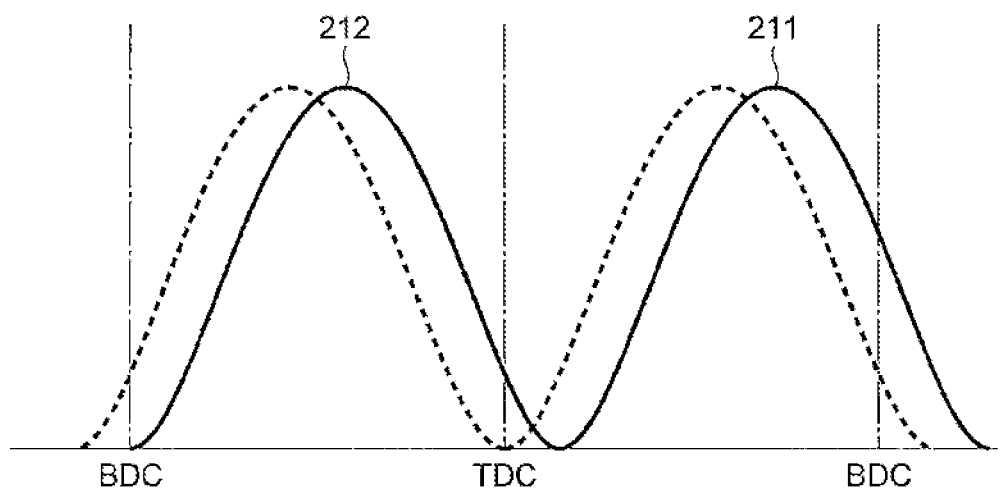
FIG. 10C is a diagram for explaining lift patterns of an intake valve and an exhaust valve.

FIGS. 10A to 10C are diagrams for explaining lift patterns of the intake valve 211 and the exhaust valve 212 provided with a phase changing mechanism. In the default condition DEF illustrated in FIG. 10A, the internal combustion engine control device 100 sets the lift patterns of the intake valve 211 and the exhaust valve 212 to the timing at which the exhaust valve 212 closes and the intake valve 211 opens in the vicinity of the top dead center TDC.

In addition, in the overlap condition OLC illustrated in FIG. 10B, the internal combustion engine control device 100 advances the lift pattern of the intake valve 211 and retards the lift pattern of the exhaust valve 212 with respect to the lift pattern of the default condition DEF illustrated by a broken line. By controlling the variable valve mechanisms of the intake valve 211 and the exhaust valve 212 in this manner by the internal combustion engine control device 100, it is possible to provide an overlap period in which both the intake valve 211 and the exhaust valve 212 are simultaneously opened.

In a case where the pressure of the exhaust flow path is higher than the pressure of the intake flow path, as illustrated in FIG. 10B, by providing an overlap period in the lift patterns of the intake valve 211 and the exhaust valve 212, it is possible to implement internal EGR in which burned gas flows backward to the intake flow path. In addition, when the intake pressure is higher than the exhaust pressure, by providing an overlap period in the lift patterns of the intake valve 211 and the exhaust valve 212, burned gas in the cylinder of the engine 210 can be scavenged to the exhaust flow path.

In the intake/exhaust slow closing condition DEL illustrated in FIG. 10C, the lift pattern of the intake valve 211 is retarded and the lift pattern of the exhaust valve 212 is retarded with respect to the default condition indicated by the broken line. By controlling the variable valve mechanisms of the intake valve 211 and the exhaust valve 212 in this manner by the control device 100, the closing timing of the exhaust valve 212 can be set to be retarded from the bottom dead center BDC, and the effective compression ratio can be reduced. By reducing the effective compression ratio in this manner, the Miller cycle can be realized.

In addition, by retarding the exhaust valve 212 in the same manner as the intake valve 211, occurrence of a negative overlap, which is a period until the intake valve 211 is opened after the exhaust valve 212 is closed, is prevented. By preventing the occurrence of the negative overlap, not only the pump loss of the engine 210 can be reduced, but also the valve opening timing of the exhaust valve 212 can be set in the vicinity of the bottom dead center BDC, so that the expansion ratio can be maximized. The method for controlling the lift patterns of the intake valve 211 and the exhaust valve 212 is not limited to the method using the variable valve mechanism. That is, the same effect can be obtained in a cam switching type variable valve system and a lift variable system.

Figure 11:
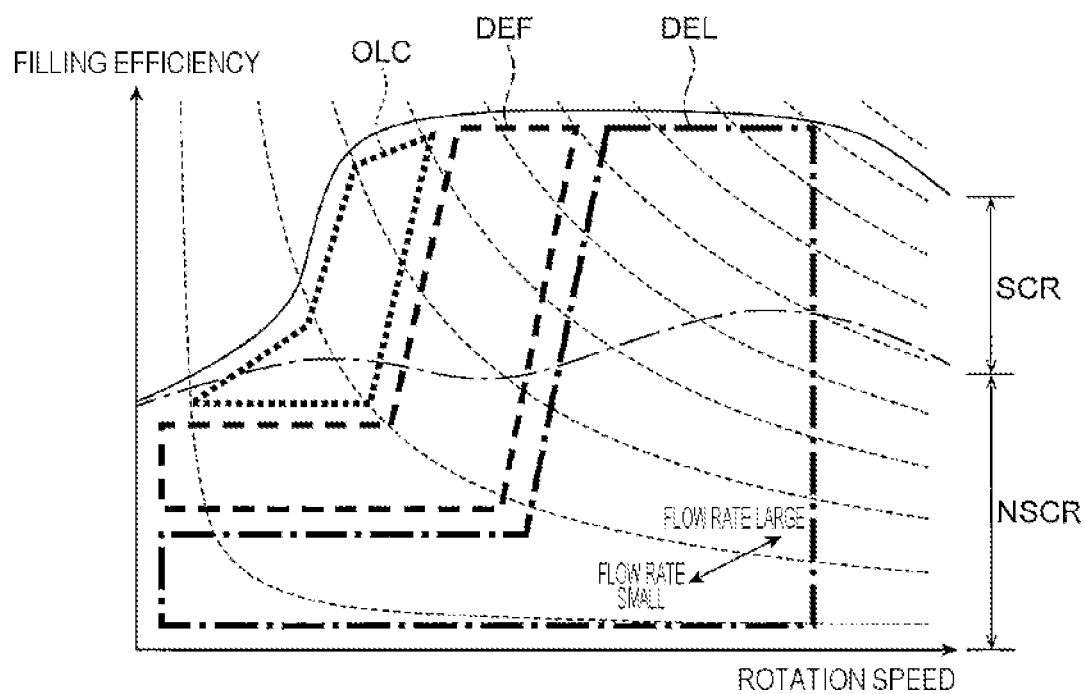
FIG. 11 is a graph for explaining control of a variable valve mechanism of an intake valve and an exhaust valve.

FIG. 11 is a graph for explaining the control of the operation amount of the variable valve mechanisms of the intake valve 211 and the exhaust valve 212. In FIG. 11, similarly to FIGS. 8 and 9, the operation region of the engine 210 is defined with the rotation speed RS as the horizontal axis and the filling efficiency as the load L as the vertical axis.

In the low-rotation speed and high-load operation region illustrated in FIG. 11, the overlap condition OLC illustrated in FIG. 10B is set by advancing the intake valve 211 and retarding the exhaust valve 212 with respect to the default condition DEF illustrated in FIG. 10A.

In the engine system 200 including the turbocharger 202, the pressure of the intake flow path is higher than the pressure of the exhaust flow path in a low-rotation speed and low-load operation region. Therefore, the remaining burned gas in the cylinder of the engine 210 can be scavenged by adjusting the lift patterns of the intake valve 211 and the exhaust valve 212 so as to overlap in this operation region. By scavenging the burned gas in the cylinder of the engine 210, not only more fresh air can be sucked into the cylinder, but also the temperature of the gas in the cylinder can be lowered. Accordingly, knocking, which is improper combustion, can be prevented.

From the above effects, by setting the lift patterns of the intake valve 211 and the exhaust valve 212 to the overlap condition OLC in the low-rotation speed and low-load operation region, it is possible to greatly improve the acceleration of the engine 210 in the engine system 200 including the turbocharger 202.

As illustrated in FIG. 11, in the low-rotation speed and low-load (low-filling efficiency) operation region, the intake valve 211 is retarded and the exhaust valve 212 is retarded with respect to the default condition DEF, and the intake/exhaust slow closing condition DEL is set. As described above, by controlling the variable valve mechanisms of the intake valve 211 and the exhaust valve 212 by the internal combustion engine control device 100, it is possible to realize the Miller cycle by decreasing the effective compression ratio and increasing the expansion ratio, and to improve the thermal efficiency of the engine 210.

As illustrated in FIG. 11, also in the high-rotation speed operation region, the variable valve mechanisms of the intake valve 211 and the intake valve 211 are set to the intake/exhaust slow closing condition DEL by the internal combustion engine control device 100. In the high-rotation speed operation region, the intake air amount in the cylinder of the engine 210 can be increased as the phases of the intake valve 211 and the exhaust valve 212 are retarded due to the inertial effect of the intake gas. Therefore, in the high-rotation speed operation region, the maximum output of the engine 210 can be improved by setting the intake/exhaust slow closing condition DEL.

As described above, the phases of the lift patterns of the intake valve 211 and the exhaust valve 212 are controlled to the steady target phase by controlling the operation amount of the variable valve mechanism based on the rotation speed RS and the load L of the engine 210 by the internal combustion engine control device 100. However, since the variable valve mechanisms of the intake valve 211 and the exhaust valve 212 incur a response delay, even under the condition in which the rotation speed RS and the load L are the same, the variable valve mechanisms may exhibit different phases depending on the immediately preceding state.

That is, the operation of the intake valve 211 is delayed in the acceleration state of shifting from the low-load operation region in which the intake valve 211 is set in the retarded state to the high-load operation region in which the intake valve 211 is retarded and set in the overlap condition OLC. Due to the delay in the operation of the intake valve 211, the scavenging by the EGR into the cylinder of the engine 210 is not sufficiently performed up to the steady target state, the ignition timing is over-advanced, and knocking may occur. Therefore, the ignition timing needs to be appropriately corrected and controlled in accordance with the current phases of the intake valve 211 and the exhaust valve 212.

According to the internal combustion engine control device 100 of the present embodiment, due to the above-described configuration illustrated in FIG. 2, the operation amount of the variable valve mechanism of the intake valve 211 and the exhaust valve 212 can be used as the specific variable V of the engine 210. In this way, the ignition timing of the engine 210 can be appropriately corrected and controlled according to the current phases of the intake valve 211 and the exhaust valve 212 based on the operation amount of the variable valve mechanism of the intake valve 211 and the exhaust valve 212.

The target control amounts of various devices constituting the engine system 200 are set to different values based on, for example, the temperature of the cooling water of the engine 210. More specifically, the temperature of the cooling water rises from the level of the atmospheric temperature immediately after the start of the engine 210, and is controlled to a constant temperature by the thermostat under the warm air condition. When the temperature of the cooling water is low, the heat loss due to the wall surface of the cylinder of the engine 210 is large, and knocking is less likely to occur as compared with the warm air condition. Therefore, the ignition timing is set to be corrected to the more advanced side under the high load condition.

Figure 12:
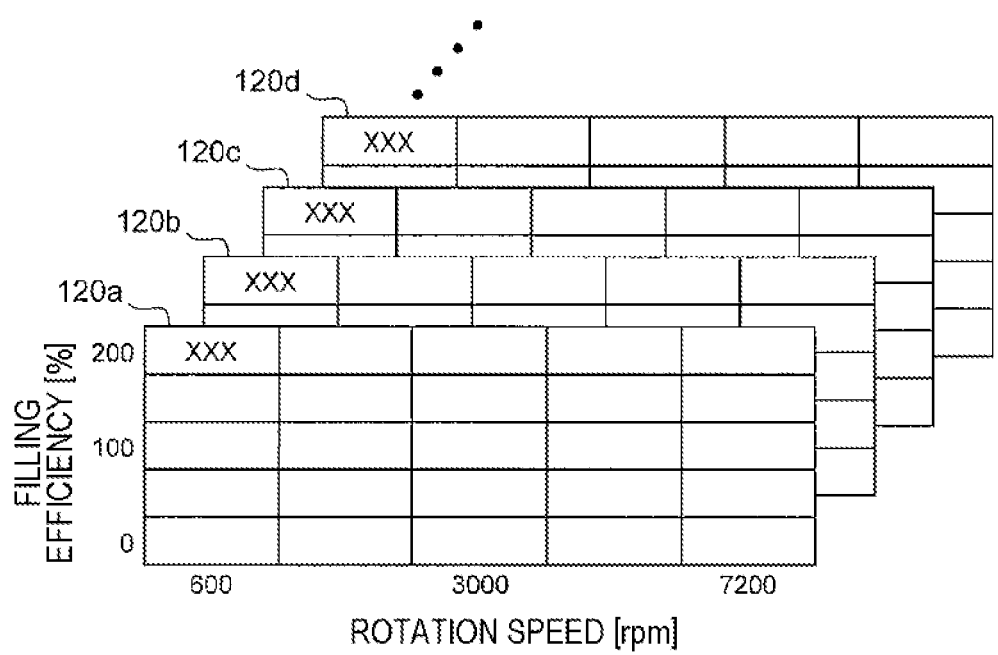
FIG. 12 is a diagram illustrating an example of a correction map of an internal combustion engine control device according to a comparative embodiment.

FIG. 12 is a diagram illustrating an example of correction maps 120*a*, 120*b*, 120*c*, 120*d*, . . . , and so on used in an internal combustion engine control device of a comparative embodiment different from the internal combustion engine control device 100 of the present embodiment. As described above, when the engine 210 is operated under conditions other than the reference condition, the ignition timing obtained by the reference map 120 as illustrated in FIG. 4 cannot be used. Therefore, for example, in addition to the reference map 120 as illustrated in FIG. 4, the conventional internal combustion engine control device needs to use a plurality of correction maps 120*a*, 120*b*, 120*c*, 120*d*, . . . , and so on in which the ignition timing that is the control amount CV is defined according to the rotation speed RS and the filling efficiency that is the load L of the engine 210 as illustrated in FIG. 12.

More specifically, in the example illustrated in FIG. 12, the correction map 120*a* is, for example, a correction map corresponding to the temperature of the cooling water, and the correction map 120*b* is, for example, a correction map corresponding to the compression ratio, that is, the operation amount of the variable compression ratio mechanism 219. The correction map 120*c* is, for example, a correction map corresponding to the EGR rate, and the correction map 120*d* is, for example, a correction map corresponding to the operation amount of the variable valve mechanism of the intake valve 211 and the exhaust valve 212. In addition, in the conventional internal combustion engine control device, in order to improve the accuracy of the control amount CV, it is necessary to consider the operation amount of the flow enhancing valve 209, the octane number of the fuel, the intake air temperature, the intake air humidity, the fuel injection timing, the fuel injection rate, the air-fuel ratio, and the like as the correction map. However, when the number of correction maps is increased, the accuracy of the control amount CV is improved, but there is a problem that the internal combustion engine control device becomes large and complex.

FIGS. 13A to 13C are graphs illustrating the relationship between the filling efficiency and the ignition timing under conditions where the rotation speed is the same and at least one of the compression ratio and the temperature of the cooling water is different. FIG. 13A illustrates the relationship between the filling efficiency and the ignition timing under the reference condition. FIG. 13B illustrates the relationship between the filling efficiency and the ignition timing under a first correction condition having a compression ratio higher than the reference condition. FIG. 13C illustrates the relationship between the filling efficiency and the ignition timing under a second correction condition having a higher compression ratio and a higher temperature of the cooling water than the reference condition.

Under the reference condition illustrated in FIG. 13A, the trace knock timing TKL and the MBT are set to be on the retard side as the filling efficiency, which is the load L of the engine 210, increases in order to prevent knocking. As illustrated in FIG. 13B, both the trace knock timing TKL1 and the MBT (MBT1) under the first correction condition having a higher compression ratio than the reference condition are set to be on the retard side from the trace knock timing TKL and the MBT under the reference condition. This is because the combustion speed and the self-ignition reaction speed are accelerated by increasing the temperature and pressure of the gas in the cylinder of the engine 210.

Further, as illustrated in FIG. 13C, the trace knock timing TKL2 under the second correction condition having a higher compression ratio and a higher temperature of the cooling water than under the reference condition is set to be on the further retard side from the trace knock timing TKL1 under the first correction condition with respect to the trace knock timing TKL under the reference condition. The MBT (MBT2) under the second correction condition is set to be on the retard side with respect to the trace knock timing TKL under the reference condition similarly to the trace knock timing TKL1 under the first correction condition. This is because the influence of the cooling water temperature on the acceleration of the self-ignition reaction speed is greatly exerted on the acceleration effect of the combustion speed.

As described above, the influence of the rotation speed RS, the load L, and another specific variable V of the engine 210 on the correction amount of the control amount CV of the engine 210 exhibits nonlinearity having an interaction effect that changes depending on the variable V. Therefore, in the calculation of the correction amount of the control amount CV of the engine 210, it is important to appropriately classify into a portion that can be calculated by the linear sum of the correction amounts and a portion that requires calculation by a nonlinear function in consideration of the interaction.

Here, as illustrated in FIG. 2 and FIGS. 3A to 3C, in the internal combustion engine control device 100 of the present embodiment, the neural network model 110 is a multilayer neural network model including the input layer Li, the intermediate layer Lm, and the output layer Lo. At least the rotation speed RS, the load L, and the specific variable V are set in each unit of the input layer Li, the weight w, the bias b, and the activation function y=f (x) are set in each unit of the intermediate layer Lm, and the control amount CV is set in the unit of the output layer Lo. In addition, in the internal combustion engine control device 100 of the present embodiment, in the neural network model 110, for example, the logistic function f_log is set as the activation function y=f (x) of the intermediate layer Lm, and the linear function f_lin is set as the activation function y=f (x) of the output layer Lo.

With this configuration, the input/output relationship can be approximated by setting the operating state of the engine 210 to the input layer Li, setting the ignition timing such as MBT and trace knock to the output layer Lo, and performing supervised machine learning on the weight w and the bias b of each neuron. Therefore, according to the internal combustion engine control device 100 of the present embodiment, a large number of correction maps 120a, 120b, 120c, 120d, . . . , and so on as illustrated in FIG. 12 are not required, and it is possible to achieve a trade-off relationship between miniaturization and simplification of the internal combustion engine control device 100 and high accuracy of the control amount CV.

In addition, as illustrated in FIGS. 2, 5A to 5C, 6, and 7, the internal combustion engine control device 100 of the present embodiment includes the determination neural network model 130 which is a logistic regression type neural network model that receives at least the rotation speed RS, the load L, and the specific variable V as inputs and outputs an index indicating whether or not the rotation speed RS, the load L, and the specific variable V are within the range of the learning condition of the neural network model 110. For example, a logistic function l_log is set as the activation function y=f(x) of the intermediate layer Lm and the output layer Lo of the determination neural network model 130. Then, when the determination neural network model 130 outputs an index indicating that the value is out of the range of the learning condition, the value of the unit constituting the final layer of the intermediate layer Lm of the neural network model 110 is limited to the range of the upper and lower limit values based on the maximum value Max and the minimum value Min of each unit.

As described above, in a case where the value is outside the region (within the extrapolation region EA) of the interpolation region IA which is the learning region of the neural network model 110, the internal combustion engine control device 100 of the present embodiment can consider that the value is outside the range of permission for use of the neural network model 110, and can perform the upper and lower limit processing on the output of the neural network model 110. Therefore, according to the internal combustion engine control device 100 of the present embodiment, the control amount CV that is the ignition timing of the engine 210 can be appropriately corrected.

Note that the internal combustion engine control device 100 of the present embodiment may include, for example, a diagnosis unit that outputs a diagnosis result when the neural network model 110 is executed. The diagnosis unit diagnoses the neural network model 110 based on the comparison between the value of the unit of the intermediate layer Lm of the neural network model 110 and the maximum value and the minimum value of each unit of the intermediate layer Lm.

In addition, as described above, the internal combustion engine control device 100 of the present embodiment includes the determination neural network model 130 which is a logistic regression type neural network model that receives at least the rotation speed RS, the load L, and the specific variable V as inputs and outputs an index indicating whether or not the rotation speed RS, the load L, and the specific variable V are within the range of the learning condition of the neural network model 110. In this case, the internal combustion engine control device 100 of the first embodiment may execute learning of the determination neural network model 130 at the time of learning of the neural network model 110.

As described above, according to the present embodiment, it is possible to provide the internal combustion engine control device 100 capable of reducing the control error of the ignition timing as compared with the conventional technique.

Second Embodiment

Hereinafter, a second embodiment of an internal combustion engine according to the present disclosure will be described with reference to FIGS. 1, 3A to 3C, 4 to 6, and 8 to 11, and FIGS. 14 to 17.

Figure 14:
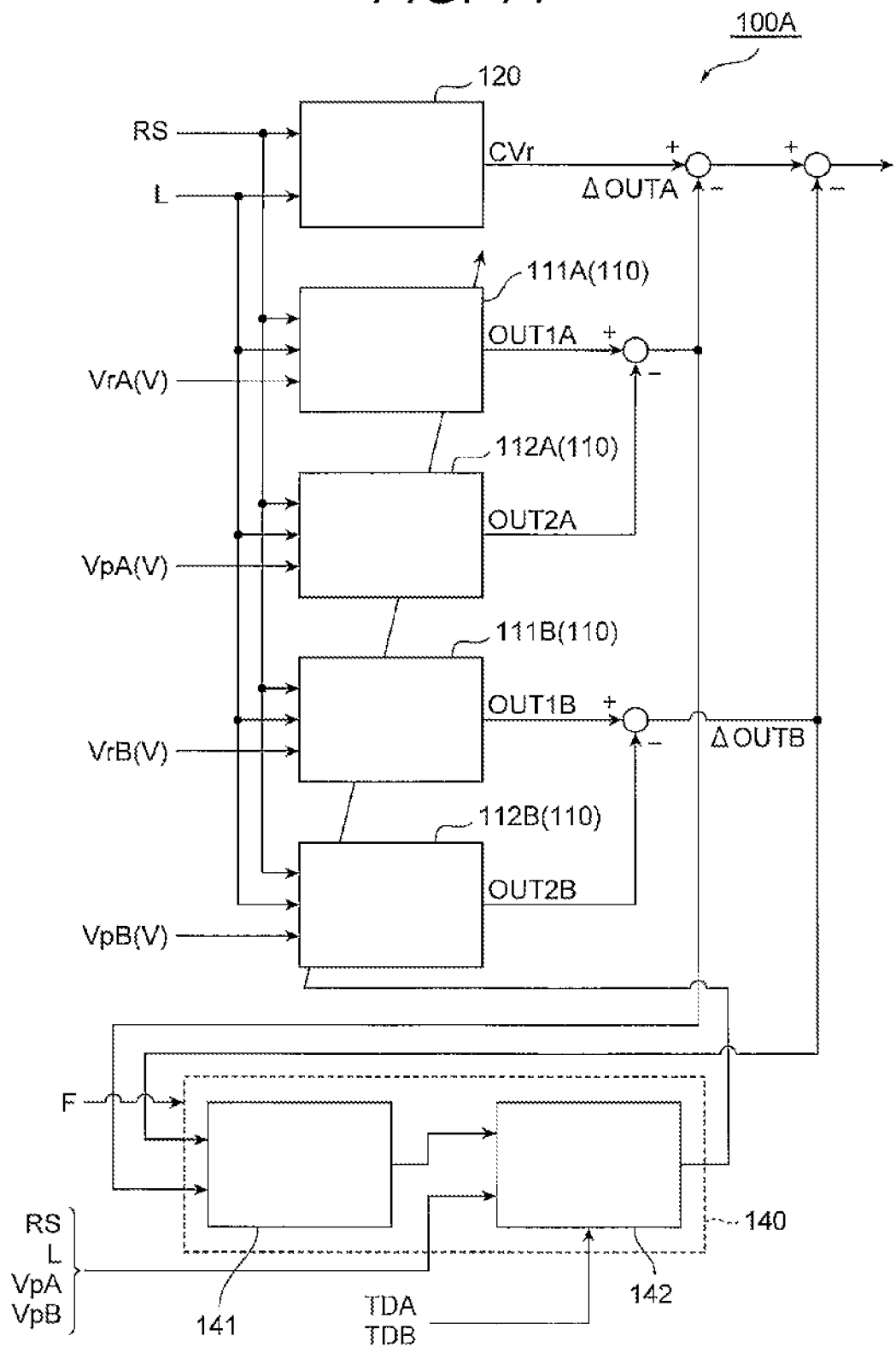
FIG. 14 is a schematic diagram illustrating a second embodiment of an internal combustion engine control device according to the present disclosure.

FIG. 14 is a schematic diagram illustrating the second embodiment of the internal combustion engine control device according to the present disclosure. An internal combustion engine control device 100A of the present embodiment is different from the internal combustion engine control device 100 according to the first embodiment described above mainly in that the number of neural network models 110 is different and a neural network model learning unit 140 is included instead of the determination neural network model 130. Since the other points of the internal combustion engine control device 100A of the present embodiment are similar to those of the internal combustion engine control device 100 according to the first embodiment described above, the same reference numerals are given to the same parts, and the description thereof will be omitted.

The internal combustion engine control device 100A of the present embodiment includes, for example, two or more sets of first neural network models 111A and 111B and second neural network models 112A and 112B.

For example, the first neural network model 111A receives the output of the knock sensor 217 or an in-cylinder pressure sensor (not illustrated) as the reference value VrA of the rotation speed RS, the load L, and the specific variable V as an input, and outputs the ignition timing which is the control amount CV as an output OUT1A. In addition, for example, the second neural network model 112A receives the output of the knock sensor 217 or the in-cylinder pressure sensor (not illustrated) as the current value VpA of the rotation speed RS, the load L, and the specific variable V as an input, and outputs the ignition timing which is the control amount CV as an output OUT2A.

The other first neural network model 111B receives, for example, the output of the in-cylinder pressure sensor (not illustrated) or the crank angle sensor 218 as the reference value VrB of the rotation speed RS, the load L, and the specific variable V as an input, and outputs the ignition timing which is the control amount CV as an output OUT1B. In addition, the other second neural network model 112B receives, for example, the output of the in-cylinder pressure sensor (not illustrated) or the crank angle sensor 218 as the current value VpB of the rotation speed RS, the load L, and the specific variable V as an input, and outputs the ignition timing which is the control amount CV as an output OUT2B.

The internal combustion engine control device 100A calculates a difference ΔOUTA between the output OUT1A of the first neural network model 111A and the output OUT2A of the second neural network model 112A as a first correction amount of the reference value CVr of the control amount CV which is the output of the reference map 120. In addition, the internal combustion engine control device 100A calculates a difference ΔOUTB between the output OUT1B of the first neural network model 111B and the output OUT2B of the second neural network model 112B as the second correction amount of the reference value CVr of the control amount CV which is the output of the reference map 120.

For example, the internal combustion engine control device 100A calculates the teacher data TDA of the trace knock timing which is the optimum ignition timing based on the current value VpA of the specific variable V which is the output of the knock sensor 217 or the in-cylinder pressure sensor of the engine 210 which is the internal combustion engine. Further, the internal combustion engine control device 100A calculates the teacher data TDB of the MBT which is the optimum ignition timing based on the current value VpB of the specific variable V which is the output of the in-cylinder pressure sensor or the crank angle sensor 218 of the engine 210, for example.

The neural network model learning unit 140 includes, for example, a model selection unit 141 and a model learning unit 142. For example, the model selection unit 141 uses the absolute value of the difference ΔOUTA between the output OUT1A of the first neural network model 111A and the output OUT2A of the second neural network model 112A as an input. In addition, for example, the model selection unit 141 uses the absolute value of the difference ΔOUTB between the output OUT1B of the first neural network model 111B and the output OUT2B of the second neural network model 112B as an input. Then, the model selection unit 141 specifies the neural network model 110 that causes an error in the control amount CV or calculates the contribution of each neural network model 110 based on the input absolute value of the difference ΔOUTA and absolute value of the difference ΔOUTB.

For example, the model learning unit 142 sets at least the rotation speed RS, the load L, and the current value VpA of the specific variable V as input variables, and sets the trace knock timing as the teacher data TDA as an output variable. In this way, for example, when the learning permission flag F is ON, the model learning unit 142 learns the weight w and the bias b of the neural network model 110 selected by the model selection unit 141, for example, the first neural network model 111A and the second neural network model 112A.

In addition, for example, the model learning unit 142 sets at least the rotation speed RS, the load L, and the current value VpB of the specific variable V as input variables, and sets MBT as the teacher data TDB as output variables. In this way, the model learning unit 142 learns the weight w and the bias b of the neural network model 110 selected by the model selection unit 141, for example, the first neural network model 111B and the second neural network model 112B.

Note that, as a learning algorithm of the model learning unit 142, for example, an error backpropagation method can be applied. The neural network model learning unit 140 reflects, for example, the weight w and the bias b, which are parameters of the neural network model 110 learned by the backpropagation method, in the neural network model 110 selected by the model selection unit 141.

Figure 15B:
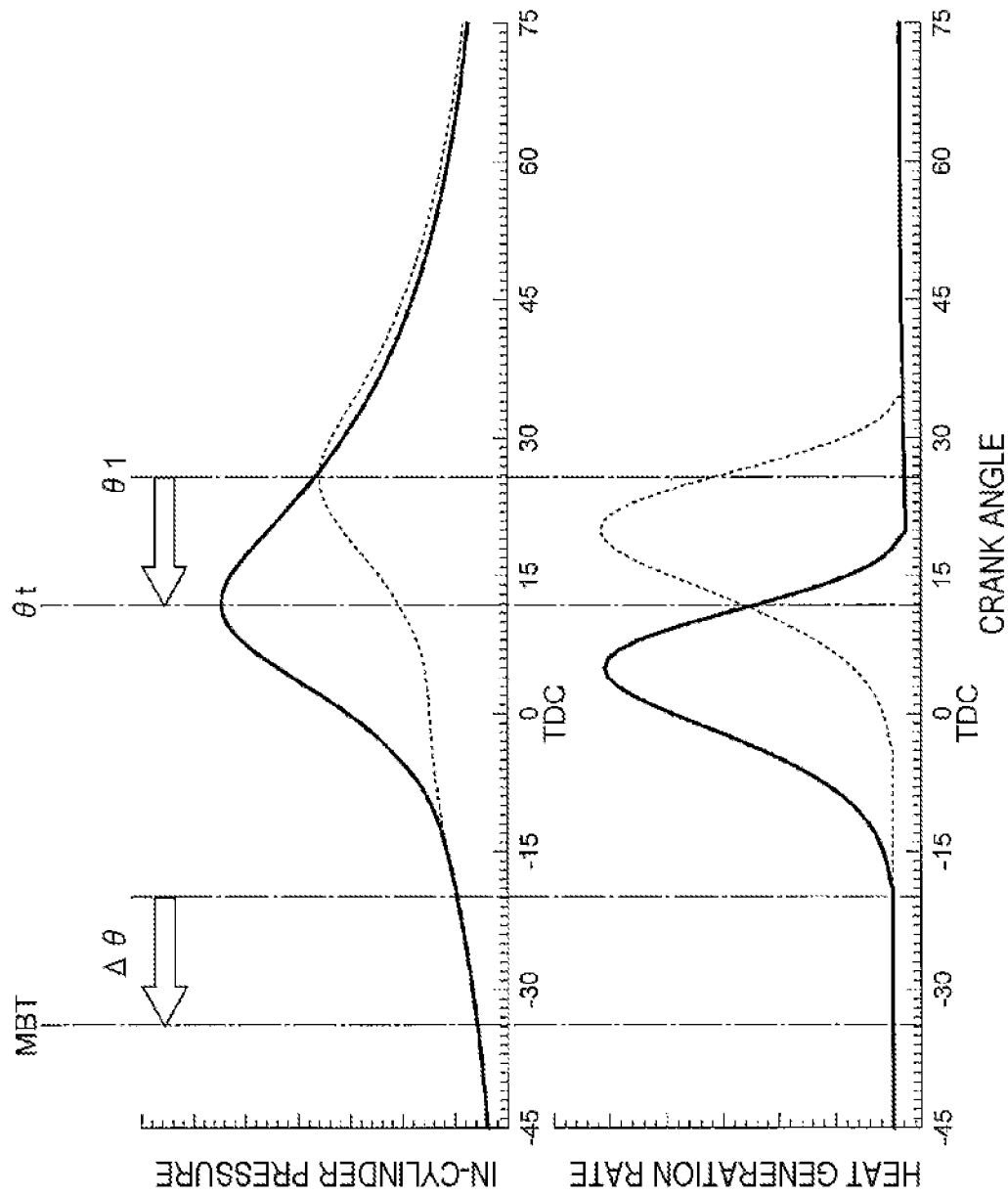
FIG. 15B is an explanatory diagram of a method of acquiring teacher data of MBT.

Here, an example of a method of acquiring the teacher data TDB of the MBT by the internal combustion engine control device 100 will be described with reference to FIGS. 15A and 15B. FIG. 15A is an enlarged view of the periphery of the intake manifold 207 and the engine 210 illustrated in FIG. 1. The upper graph in FIG. 15B is a graph in which the horizontal axis is the crank angle and the vertical axis is the in-cylinder pressure, and the lower graph in FIG. 15B is a graph in which the horizontal axis is the crank angle and the vertical axis is the heat generation rate.

Various physical quantities related to the combustion timing of the engine 210 can be calculated based on the pressure in the cylinder of the engine 210 with respect to the crank angle, that is, the in-cylinder pressure. As illustrated in FIG. 15B, the timing at which the in-cylinder pressure becomes the maximum can be defined as the information of the in-cylinder pressure, and when the ignition timing is set so that the timing is, for example, about 13 degrees after the top dead center TDC, the thermal efficiency shows the maximum value.

For example, when the timing θ1 at which the in-cylinder pressure measured by the in-cylinder pressure sensor 217a is the maximum is on the advance side of the target timing θt with respect to the current ignition timing, it is considered that an error occurs on the advance side with respect to the true value of the MBT. In this case, the MBT to which the error Δθ is added is set as the teacher data TDB. The teacher data TDB can be set with a similar idea for the error on the retard side.

Examples of the physical quantity related to the combustion timing of the engine 210 other than the timing when the in-cylinder pressure becomes maximum include a combustion mass ratio timing such as a combustion mass 50% timing and a combustion mass 90% timing, a heat generation rate peak timing, and an instantaneous torque peak timing. The heat generation rate and the combustion mass ratio can be calculated by a heat generation rate calculation formula expressed by the following expression (3) based on the detection value of the in-cylinder pressure sensor 217a and the in-cylinder volume, that is, the volume of the cylinder of the engine 210. In Equation (3), V is the volume of the cylinder, k is the specific heat ratio, p is the pressure in the cylinder (in-cylinder pressure), and θ is the crank angle. The instantaneous torque peak timing can be derived from the temporal change behavior of the crank angle sensor.

$$\frac{dQ}{d\theta} = \frac{V}{k-1}\left(\frac{dp}{d\theta} + \frac{kp}{V}\frac{dV}{d\theta}\right) \qquad (3)$$

Next, with reference to FIGS. 16A to 16C, an example of a method for acquiring the teacher data TDA of the trace knock timing by the internal combustion engine control device 100A will be described.

When the teaching data TDA of the trace knock timing is acquired using the output of the knock sensor 217 illustrated in FIG. 1, the vibration of the cylinder block of the engine 210 due to knocking is detected based on the output of the knock sensor 217. Since the vibration of the cylinder block includes a signal component other than knocking caused by the operation of the fuel injection valve 215 and the operations of the intake valve 211 and the exhaust valve 212, a detection window is set.

Figure 16B:
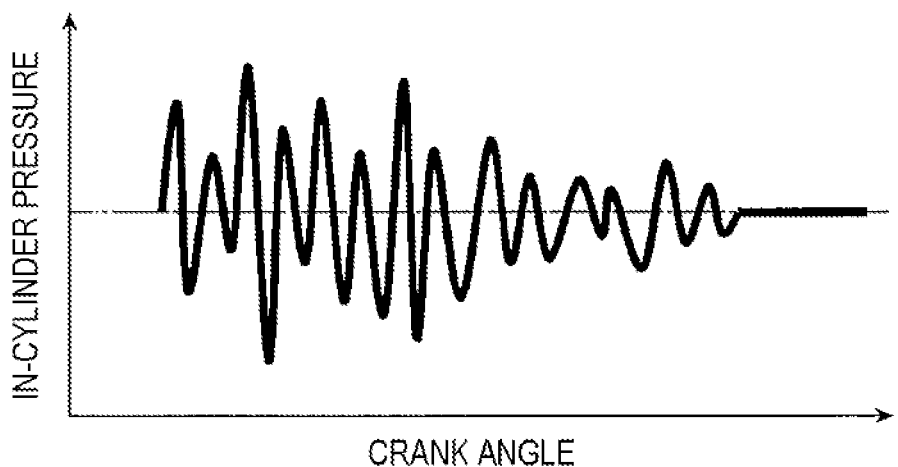
FIG. 16B is an explanatory diagram of a method of acquiring teacher data of a trace knock timing.
Figure 16C:
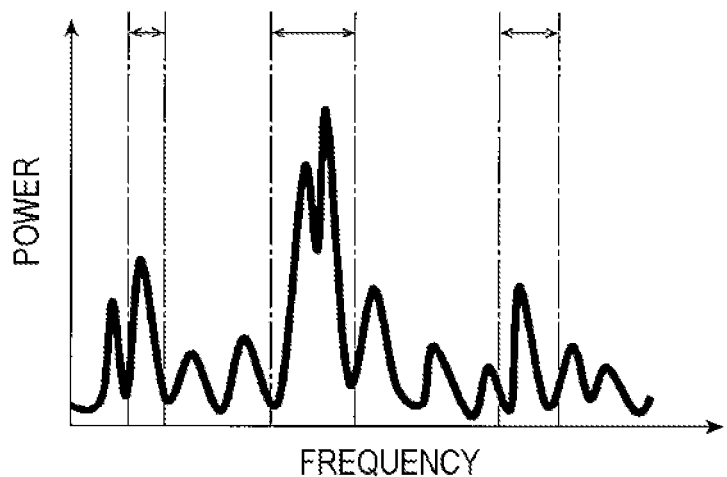
FIG. 16C is an explanatory diagram of a method of acquiring teacher data of a trace knock timing.

FIG. 16A is a graph illustrating a method of acquiring the teacher data TDA of the trace knock timing using the in-cylinder pressure sensor 217a illustrated in FIG. 15A. When the teacher data TDA of the trace knock timing is acquired using the output of the in-cylinder pressure sensor 217a, in order to detect an abnormal waveform WA due to knock, the output of the in-cylinder pressure sensor 217a is processed by a high-pass filter for removing a normal combustion waveform as illustrated in FIG. 16B.

Next, signal processing such as fast Fourier transform is performed on the output of the knock sensor 217 in the detection window or the output of the in-cylinder pressure sensor 217a subjected to the high-pass filter processing. In this way, as illustrated in FIG. 16C, it is possible to calculate power for each frequency with respect to the output of the knock sensor 217 or the output of the in-cylinder pressure sensor 217a, and to calculate presence of occurrence of knock and knock intensity from an integrated value of power of frequencies related to a knock vibration component.

Figure 16D:
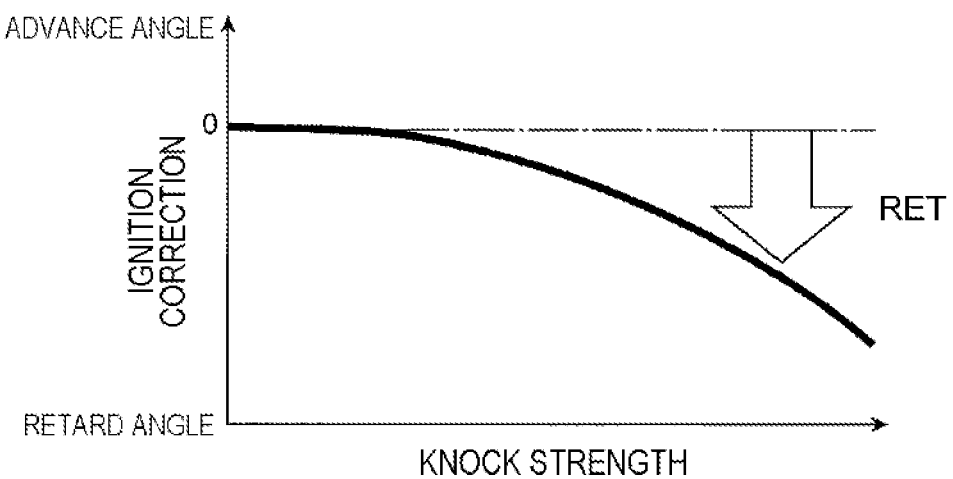
FIG. 16D is an explanatory diagram of a method of acquiring teacher data of a trace knock timing.

Finally, based on the relationship of the retard amount RET of the ignition timing according to the knock intensity as shown in, for example, FIG. 16D, it is possible to know at which timing a true trace knock exists with respect to the current ignition timing. The parameters of the neural network model 110 can be learned using the true trace knock timing as the teacher data TDA.

Hereinafter, the operation of the internal combustion engine control device 100A of the present embodiment will be described with reference to FIG. 17.

Figure 17:
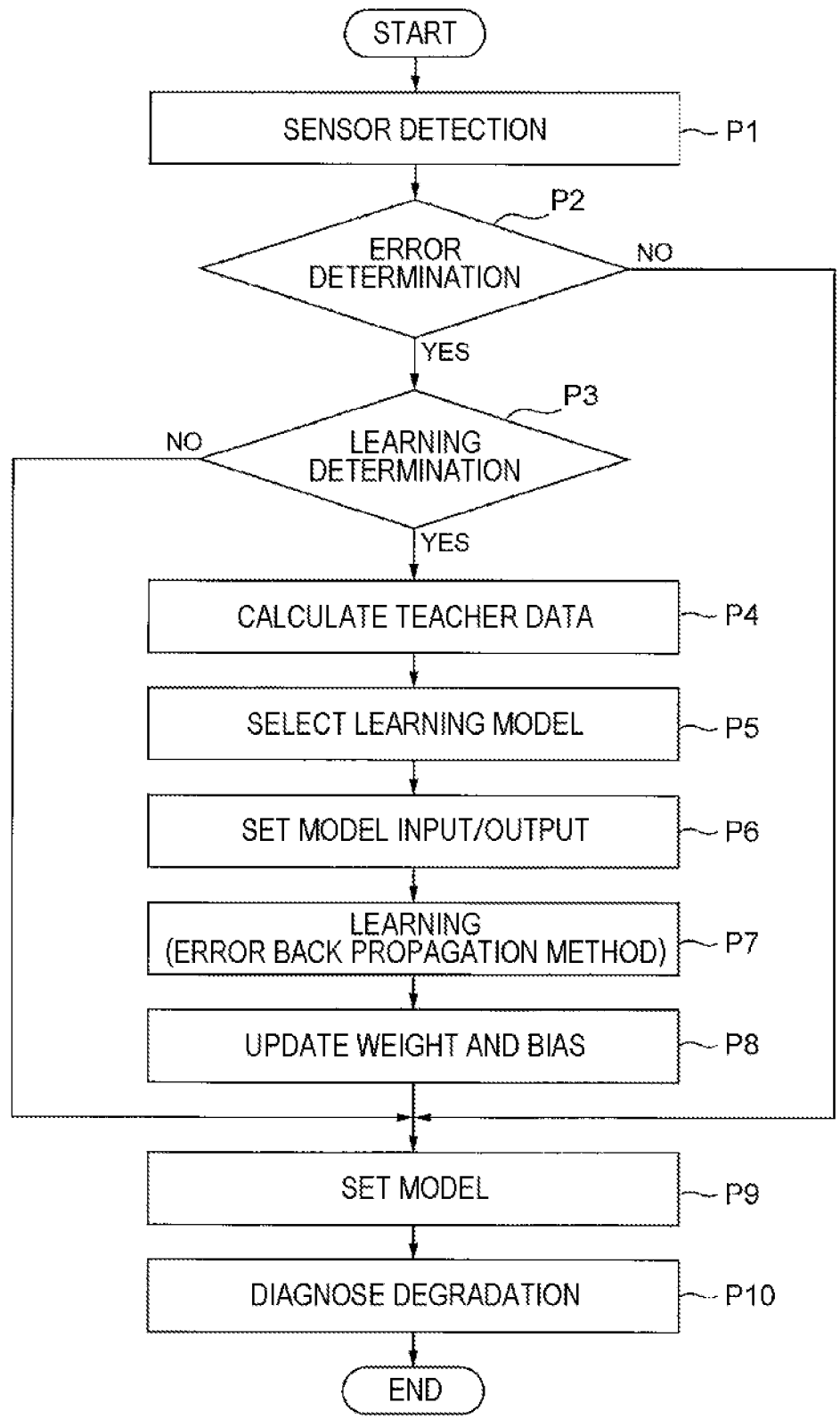
FIG. 17 is a flowchart illustrating a processing flow of the internal combustion engine control device illustrated in FIG. 14.

FIG. 17 is a flowchart illustrating a processing flow of the internal combustion engine control device 100A of the present embodiment.

First, in process P1, the internal combustion engine control device 100A detects the combustion state of the engine 210 controlled based on the control amount CV output by the internal combustion engine control device 100A based on the outputs of various sensors constituting the engine system 200.

In process P1, examples of the sensor that detects the combustion state of the engine 210 include the in-cylinder pressure sensor 217a, the knock sensor 217, and the crank angle sensor 218. Examples of the combustion state of the engine 210 include the maximum in-cylinder pressure timing, which is the timing when the pressure in the cylinder becomes maximum, and the knock strength.

Next, in process P2, the internal combustion engine control device 100A determines the occurrence of an error of the control amount CV. In process P2, for example, the internal combustion engine control device 100A determines that an error has occurred (YES) in a case where a numerical value indicating the combustion state of the engine 210 indicates a deviation state in which the numerical value is equal to or larger than a predetermined threshold value set in advance, and executes process P3.

On the other hand, in process P2, when the internal combustion engine control device 100A determines that no error has occurred (NO), process P9 to be described later is executed.

In process P3, the internal combustion engine control device 100A determines whether or not it is a condition for performing learning. For example, when the engine system 200 is in a transient state, it is assumed that learning of the neural network model 110 cannot be normally performed. Therefore, in process P3, for example, when it is determined that the engine system 200 is in the transient state, the internal combustion engine control device 100A determines that the learning of the neural network model 110 is prohibited (NO), and executes process P9 to be described later. On the other hand, in process P3, when it is determined that the engine system 200 is in the steady state, for example, the internal combustion engine control device 100A determines that the learning of the neural network model 110 is permitted (YES), and executes process P4.

In process P4, the internal combustion engine control device 100A calculates teacher data TDA and TDB set to the output layer Lo of the neural network model 110. As the teacher data TDA of the trace knock timing, as illustrated in FIG. 16D described above, the target ignition timing et in which the retard amount RET, which is the retard amount of the ignition timing with respect to the knock intensity, is added to the current trace knock timing can be used.

In addition, as the teacher data TDB of the MBT, a value obtained by adding the difference between the current maximum in-cylinder pressure timing and the target maximum in-cylinder pressure timing, that is, the error $\Delta\theta$ between the timing el at which the in-cylinder pressure measured by the in-cylinder pressure sensor 217a illustrated in FIG. 15B becomes the maximum and the target timing θt to the current MBT can be used. As a method of detecting the true MBT, for example, a combustion mass ratio timing such as a combustion mass 50% timing and a combustion mass 90% timing, a heat generation rate peak timing, an instantaneous torque peak timing, and the like can also be used.

Next, in process P5, the internal combustion engine control device 100A specifies the neural network model 110 in which an error occurs in the ignition timing, which is the control amount CV, based on the magnitude relationship between the absolute values of the differences $\Delta$OUTA and $\Delta$OUTB, which are the correction amounts, or calculates the degree of contribution by the model selection unit 141 illustrated in FIG. 14, for example.

Next, in process P6 to process P8, the internal combustion engine control device 100A executes on-board learning for the neural network model 110 by the neural network model learning unit 140. The rotation speed RS, the load L (filling efficiency), and the reference values VrA and VrB of the specific variable V are set as teacher data in the input layer Li of the neural network model 110, and the true MBT and the trace knock timing based on the detection value of the sensor are set in the output layer Lo of the same model. As a learning algorithm of the neural network model 110, an error backpropagation method is applied. The neural network model learning unit 140 reflects the parameters (weight w and bias b) of the neural network model 110 learned by the backpropagation method in the neural network model 110 and executes process P9.

In process P9, the internal combustion engine control device 100A sets the latest parameters in each neural network model 110 constituting the ignition timing control model. In this way, by on-board learning the parameters of the neural network model 110 based on the outputs of the sensors constituting the engine system 200, it is possible to appropriately correct a steady control error caused by temporal changes in the characteristics or individual variations of the engine 210 and the engine system 200.

Next, in process P10, the internal combustion engine control device 100A diagnoses the degree of time degradation of the characteristics of the internal combustion engine, that is, the engine 210 or the engine system 200 based on the result of on-board learning of the parameters of the neural network model 110 using the output of the sensor. For example, in a case where the MBT is learned to be advanced from a predetermined value, it can be regarded as an abnormal state in which the combustion speed is more slowed than expected or a sign leading to an abnormal state. Therefore, the internal combustion engine control device 100A outputs a diagnosis result for notifying the sign. In addition, in a case where the trace knock timing is learned to be retarded from a predetermined value, it can be regarded as an abnormal state in which occurrence of knock becomes more remarkable than expected or a sign leading to an abnormal state. Therefore, the internal combustion engine control device 100A outputs a diagnosis result for notifying the sign.

As described above, according to the present embodiment, similarly to the first embodiment described above, it is possible to provide the internal combustion engine control device 100A capable of reducing the control error of the ignition timing as compared with the conventional technique.

In addition, the internal combustion engine control device 100A of the present embodiment includes the neural network model learning unit 140 for learning the weight w and the bias b of the neural network model 110. Furthermore, the internal combustion engine control device 100A calculates the teacher data TDA of the trace knock timing which is the optimum ignition timing based on the output of the knock sensor 217 or the in-cylinder pressure sensor 217a of the engine 210 which is the internal combustion engine. Then, the neural network model learning unit 140 sets at least the rotation speed RS, the load L, and the specific variable Vas input variables, and sets the trace knock timing as the teacher data TDA as an output variable.

In addition, the internal combustion engine control device 100A of the present embodiment includes the neural network model learning unit 140 for learning the weight w and the bias b of the neural network model 110. Furthermore, the internal combustion engine control device 100A calculates the teacher data TDB of the MBT which is the optimum ignition timing based on the output of the in-cylinder pressure sensor 217a or the crank angle sensor 218 of the engine 210 which is the internal combustion engine. Then, the neural network model learning unit 140 sets at least the rotation speed RS, the load L, and the specific variable V as input variables and sets the MBT as the teacher data TDB as an output variable.

In addition, in the internal combustion engine control device 100A of the present embodiment, when the trace knock timing is learned to be retarded from the threshold value, the neural network model learning unit 140 diagnoses an abnormal state or a sign leading to an abnormality and outputs a diagnosis result. In addition, in the internal combustion engine control device 100A according to the present embodiment, when the MBT is learned to be advanced from the threshold value, the neural network model learning unit 140 diagnoses an abnormal state or a sign leading to an abnormality and outputs a diagnosis result. Furthermore, in the internal combustion engine control device 100A of the present embodiment, the neural network model learning unit 140 determines whether or not the engine 210 which is an internal combustion engine or the engine system 200 is in a transient state, and prohibits learning when it is determined that the engine is in the transient state.

With the above configuration, the combustion state when the engine 210 as the internal combustion engine is controlled according to the control amount CV of the current ignition timing can be detected by the sensors such as the in-cylinder pressure sensor 217a, the knock sensor 217, and the crank angle sensor 218. In this way, the degree of deviation between the current control amount CV and the true control state can be indirectly detected. In addition, by providing the neural network model 110 for each specific variable V which is a correction parameter and selecting the neural network model 110 to be learned on the basis of the magnitude relationship between the absolute values of the differences $\Delta OUTA$ and $\Delta OUTB$ which are correction amounts, it is possible to reduce the arithmetic load required for learning.

In addition, the internal combustion engine control device 100A of the present embodiment may include, for example, the neural network model learning unit 140 that selects the neural network model 110 to be learned on the basis of the correction amount and executes learning in a case where the difference between the output of the sensor that detects the combustion state of the engine 210 that is the internal combustion engine and the reference value of the control amount CV corrected by the difference $\Delta OUTA$ and the difference $\Delta OUTB$ that are the correction amounts is equal to or larger than a threshold value.

Although the embodiments of the internal combustion engine control device according to the present disclosure have been described in detail with reference to the drawings, the specific configuration is not limited to these embodiments, and modifications in design and the like without departing from the gist of the present disclosure are also included in the present disclosure.

For example, in the above-described embodiment, the optimum ignition timing (MBT timing or trace knock timing) is set to the output of the neural network model, but the internal combustion engine control device according to the present disclosure is not limited thereto. For example, the torque, the exhaust gas temperature, and the exhaust gas composition may be set as the output of the neural network model, and the internal combustion engine control device can be used as estimation means.

REFERENCE SIGNS LIST 100 internal combustion engine control device
100A internal combustion engine control device
110 neural network model
111 first neural network model
111A first neural network model
111B first neural network model
112 second neural network model
112A second neural network model
112B second neural network model
130 determination neural network model (logistic regression type neural network model)
140 neural network model learning unit 200 engine system (internal combustion engine)
209 flow enhancing valve
210 engine (internal combustion engine)
217 knock sensor
217a in-cylinder pressure sensor
218 crank angle sensor
219 variable compression ratio mechanism
b bias
CV control amount
CVr reference value of control amount
f_log logistic function
f_lin linear function
L load
Li input layer
Lm intermediate layer
Lo output layer
Max maximum value
Min minimum value
RS rotation speed
R_OUT ratio (correction amount)
TDA teacher data of trace knock timing
TDB MBT teacher data
V specific variable
Vr reference value of specific variable
Vp current value of specific variable
w weight
y=f(x) activation function
ΔOUT difference (correction amount)
ΔOUTA difference (correction amount)
ΔOUTB difference (correction amount)

The invention claimed is:

1. An internal combustion engine control device comprising a neural network model that receives three or more variables including at least a rotation speed, a load, and another specific variable of an internal combustion engine as inputs and outputs a control amount of the internal combustion engine,
wherein the neural network model includes a first neural network model having a reference value of the specific variable as an input and a second neural network model having a current value of the specific variable as an input, and
a reference value of the control amount calculated based on the rotation speed and the load is corrected using a difference or a ratio between the output of the first neural network model and the output of the second neural network model as a correction amount.

2. The internal combustion engine control device according to claim 1, wherein the control amount of the internal combustion engine is an optimum ignition timing.

3. The internal combustion engine control device according to claim 1, wherein the specific variable of the internal combustion engine is an operation amount of a variable compression ratio mechanism, an operation amount of a variable valve mechanism, a cooling water temperature, an exhaust gas recirculation rate, an operation amount of a flow enhancing valve, an octane number of fuel, an intake air temperature, an intake air humidity, a fuel injection timing, a fuel injection rate, or an air-fuel ratio.

4. The internal combustion engine control device according to claim 1, wherein
the neural network model is a multilayer neural network model including an input layer, an intermediate layer, and an output layer,
at least the rotation speed, the load, and the specific variable are set to each unit of the input layer, and
a weight, a bias, and an activation function are set for each unit of the intermediate layer, and
the control amount is set in a unit of the output layer.

5. The internal combustion engine control device according to claim 4, further comprising a neural network model learning unit that learns the weight and the bias of the neural network model,
wherein the internal combustion engine control device calculates teacher data of a trace knock timing based on an output of a knock sensor or an in-cylinder pressure sensor of the internal combustion engine, and
the neural network model learning unit sets at least the rotation speed, the load, and the specific variable as input variables, and sets the trace knock timing as the teacher data as an output variable.

6. The internal combustion engine control device according to claim 5, wherein the neural network model learning unit diagnoses an abnormal state or a sign leading to an abnormality and outputs a diagnosis result when the trace knock timing is learned to be retarded from a threshold value.

7. The internal combustion engine control device according to claim 4, further comprising a neural network model learning unit that learns the weight and the bias of the neural network model,
wherein the internal combustion engine control device calculates teacher data of an MBT based on an output of an in-cylinder pressure sensor or a crank angle sensor of the internal combustion engine, and
the neural network model learning unit sets at least the rotation speed, the load, and the specific variable as input variables, and sets the MBT as the teacher data as an output variable.

8. The internal combustion engine control device according to claim 7, wherein the neural network model learning unit diagnoses an abnormal state or a sign leading to an abnormality and outputs a diagnosis result when the MBT is learned to be advanced from a threshold value.

9. The internal combustion engine control device according to claim 4, wherein
a logistic function is set as the activation function of the intermediate layer, and
a linear function is set as the activation function of the output layer.

10. The internal combustion engine control device according to claim 4, further comprising a diagnosis unit that outputs a diagnosis result when the neural network model is executed,
wherein the diagnosis unit diagnoses the neural network model based on a comparison between a value of the unit of the intermediate layer and a maximum value and a minimum value of each of the units of the intermediate layer.

11. The internal combustion engine control device according to claim 1, further comprising a logistic regression type neural network model that receives at least the rotation speed, the load, and the specific variable as inputs and outputs an index indicating whether or not the rotation speed, the load, and the specific variable are within a range of a learning condition of the neural network model.

12. The internal combustion engine control device according to claim 11, wherein a logistic function is set as an activation function of an intermediate layer and an output layer of the logistic regression type neural network model.

13. The internal combustion engine control device according to claim 11, wherein in a case where the logistic regression type neural network model outputs an index indicating that the input values are outside the range of the learning condition, values of units constituting a final layer of the intermediate layer of the neural network model are limited to a range of upper and lower limit values based on a maximum value and a minimum value of each of the units.

14. The internal combustion engine control device according to claim 1, further comprising a neural network model learning unit that selects the neural network model to be learned on the basis of the correction amount and executes learning in a case where a difference between an output of a sensor that detects a combustion state of the internal combustion engine and the reference value corrected by the correction amount is equal to or larger than a threshold value.

15. The internal combustion engine control device according to claim 14, further comprising a logistic regression type neural network model that receives at least the rotation speed, the load, and the specific variable as inputs and outputs an index indicating whether or not the rotation speed, the load, and the specific variable are within a range of a learning condition of the neural network model,
wherein learning of the logistic regression type neural network model is executed at the time of learning of the neural network model.

16. The internal combustion engine control device according to claim 1, wherein the neural network model learning unit determines whether or not the internal combustion engine is in a transient state, and prohibits the learning when it is determined that the internal combustion engine is in the transient state.

\* \* \* \* \*